United States Patent
Shamir et al.

(10) Patent No.: US 12,536,436 B2
(45) Date of Patent: Jan. 27, 2026

(54) TRAINING MACHINE LEARNING MODELS USING QUANTILE AND MEDIAN RANKING DISTILLATION

(71) Applicant: Google LLC, Mountain View, CA (US)

(72) Inventors: Gil Shamir, Sewickley, PA (US); Zhuoshu Li, Pittsburgh, PA (US)

(73) Assignee: Google LLC, Mountain View, CA (US)

( * ) Notice: Subject to any disclaimer, the term of this patent is extended or adjusted under 35 U.S.C. 154(b) by 890 days.

(21) Appl. No.: 17/830,561

(22) Filed: Jun. 2, 2022

(65) Prior Publication Data
US 2023/0252281 A1    Aug. 10, 2023

Related U.S. Application Data

(60) Provisional application No. 63/308,866, filed on Feb. 10, 2022.

(51) Int. Cl.
*G06N 3/08* (2023.01)
*G06F 18/10* (2023.01)
*G06F 18/21* (2023.01)
*G06N 3/045* (2023.01)

(52) U.S. Cl.
CPC .............. *G06N 3/08* (2013.01); *G06F 18/10* (2023.01); *G06F 18/2193* (2023.01); *G06N 3/045* (2023.01)

(58) Field of Classification Search
CPC .......... G06N 3/08; G06N 3/045; G06N 3/047; G06N 3/048; G06N 3/09; G06N 3/096; G06N 3/084; G06F 18/10; G06F 18/2193
See application file for complete search history.

(56) References Cited

U.S. PATENT DOCUMENTS

2017/0140248 A1    5/2017   Wang et al.

OTHER PUBLICATIONS

Ranking Distillation: Learning Compact Ranking Models With High Performance for Recommender System (Year: 2018).*
International Preliminary Report on Patentability in International Appln. No. PCT/US2023/012824, mailed on Aug. 22, 2024, 11 pages.

(Continued)

*Primary Examiner* — Pei Yong Weng
(74) *Attorney, Agent, or Firm* — Fish & Richardson P.C.

(57) ABSTRACT

Methods, systems, and apparatus, including computer programs encoded on a computer storage medium, that obtain a first machine learning model that is configured to output a score. The training examples can each include feature values that represent features of an item, and an outcome label for the item. From the training examples, training pairs of training examples are determined. For each training pair: (i) a score is generated for each training example in the training pair using the first machine learning model; and (ii) for the training pair, a score difference of the scores generated for the training examples in the training pair is determined. Using the training pairs and the score differences, a second machine learning model is trained to produce score differences that, for the same training examples, are within a threshold value of the score differences produced by the first machine learning model.

20 Claims, 22 Drawing Sheets

(56) References Cited

OTHER PUBLICATIONS

Bruch et al., "An analysis of the softmax cross entropy loss for learning-to-rank with binary relevance." Proceedings of the 2019 ACM SIGIR international conference on theory of information retrieval, Sep. 2019, 75-78.

Burges et al., "Learning to rank using gradient descent." Proceedings of the 22nd international conference on Machine learning, Aug. 2005, 8 pages.

Burges et al., "Learning to rank with nonsmooth cost functions." Advances in neural information processing systems 19, 2006, 8 pages.

Burges, Christopher JC. "From ranknet to lambdarank to lambdamart: An overview." Learning 11.23-581, Jun. 2010: 81., 19 pages.

Cao et al., "Learning to rank: from pairwise approach to listwise approach." Proceedings of the 24th international conference on Machine learning, Jun. 2007, 9 pages.

Hinton et al., "Distilling the Knowledge in a Neural Network" submitted on Mar. 9, 2015, arXiv:1503.02531v1, 9 pages.

Joachims, "Optimizing search engines using clickthrough data." Proceedings of the eighth ACM SIGKDD international conference on Knowledge discovery and data mining, Jul. 2002, 11 pages.

Pasumarthi et al., "Tf-ranking: Scalable tensorflow library for learning-to-rank." Proceedings of the 25th ACM SIGKDD International Conference on Knowledge Discovery & Data Mining, Aug. 2019, 2970-2978.

Reddi et al., "Rankdistil: Knowledge distillation for ranking." International Conference on Artificial Intelligence and Statistics. PMLR, Mar. 2021, 11 pages.

Sculley, "Combined regression and ranking." Proceedings of the 16th ACM SIGKDD international conference on Knowledge discovery and data mining, Jul. 2010, 9 pages.

Sculley, "Large scale learning to rank." 2009, 6 pages.

Sculley, D. "Rank aggregation for similar items." Proceedings of the 2007 SIAM international conference on data mining. Society for Industrial and Applied Mathematics, Apr. 2007, 12 pages.

Tang et al., "Ranking distillation: Learning compact ranking models with high performance for recommender system." Proceedings of the 24th ACM SIGKDD international conference on knowledge discovery & data mining, Jul. 2018, 10 pages.

Wang et al., "The lambdaloss framework for ranking metric optimization." Proceedings of the 27th ACM international conference on information and knowledge management, Oct. 2018, 10 pages.

Wikipedia.org [online], "Rank Correlation" Dec. 2005, retrieved on Mar. 30, 2023, retrieved from URL <https://en.wikipedia.org/wiki/Rank_correlation>, 5 pages.

Gou et al., "Knowledge distillation: A survey." Submitted on May 2021, arXiv:2006.05525v7, 36 pages.

International Search Report and Written Opinion in International Appln. No. PCT/US2023/012824, mailed on May 24, 2023, 18 pages.

* cited by examiner

TRAINING MACHINE LEARNING MODELS USING QUANTILE AND MEDIAN RANKING DISTILLATION

CROSS REFERENCE TO RELATED APPLICATION

This application claims the benefit of U.S. Provisional Application No. 63/308,866, filed Feb. 10, 2022, the contents of which are incorporated by reference herein.

TECHNICAL FIELD

This specification relates to training machine learning models, and more specifically to training machine learning models using L1 and quantile ranking distillation.

BACKGROUND

Training and evaluating complex machine learning models, such as deep neural networks (DNNs), can be computationally complex, requiring powerful computers to complete. While such models can produce extremely accurate results, in computationally constrained environments, such as mobile phones or personal computers, it is not computationally feasible to train such models.

SUMMARY

Knowledge transfer from a complex, computationally-expensive to train, teacher model to a simple, less computationally-expensive to train student model can improve the quality of the training of the student model without exceeding the computational capabilities of the computing system hosting the student model. Such knowledge transfer can be called "knowledge distillation" or simply "distillation."

While many machine learning models are trained on one objective that encourages better prediction accuracy, recommender applications (and among other application types) attempt to optimize across multiple objectives, such as prediction accuracy and ranking accuracy. Misspecification of practical models may lead to different optima for the different objectives.

This specification describes novel techniques that use quantile regression (QR), L1 regression, and modifications of QR and L1 regression to improve rankings, including when rankings are transferred from a teacher model to a student model. Such a transfer is referred to as distillation. Rankings are improved even when models are m is-specified. Distilling student score differences of objects, in a set of objects ranked against each other, towards either the quantiles or the median of the teacher model's score differences provides significant benefits in training the student model, which can result in improved ranking performance of the student model.

Particular embodiments of the subject matter described in this specification can be implemented so as to realize one or more of the following advantages. The techniques described below can be used to train a student model such that it can execute on a device with limited resources while producing results similar to results produced on devices that are more capable. In addition, the techniques result in improved model training efficiency, reducing the resources required to complete training. Further, the techniques enable the student model to produce accurate predicted rankings of items within a recommendation list.

One aspect features obtaining a first machine learning model that is configured to output a score and that has been trained on multiple training examples. The training examples can each include feature values that represent features of an item, and an outcome label for the item. From the training examples, training pairs of training examples are determined, where each training pair can include a first training example and a second training example. For each training pair: (i) a score is generated for each training example in the training pair using the first machine learning model; and (ii) for the training pair, a score difference of the scores generated for the training examples in the training pair is determined. Using the training pairs and the score differences, a second machine learning model is trained to produce score differences that, for the same training examples, are within a threshold value of the score differences produced by the first machine learning model. The training can be based, in part, on one or more quantile loss functions that each receive, as input, one or more of the score differences.

One or more of the following features can be included. The score can be a logit score or a predicted probability. The score difference can be a sigmoid of logit score differences. The quantile losses for multiple quantiles can be produced by a smooth function. The smooth function can be one of a Huber loss, SmeLU, G-SmeLU, LogCosh, Swish, Sigmoid or Softplus. A quantile loss function in the one or more quantile loss functions can be an L1 loss, a median loss or an absolute value loss. A loss can be determined, at least in part, by determining a difference between a teacher score and a student score. Determining the training pairs of training examples can include, for each training pair in the pairs of training examples, determining that the outcome label of the first training example differs from the outcome label of the second training example.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
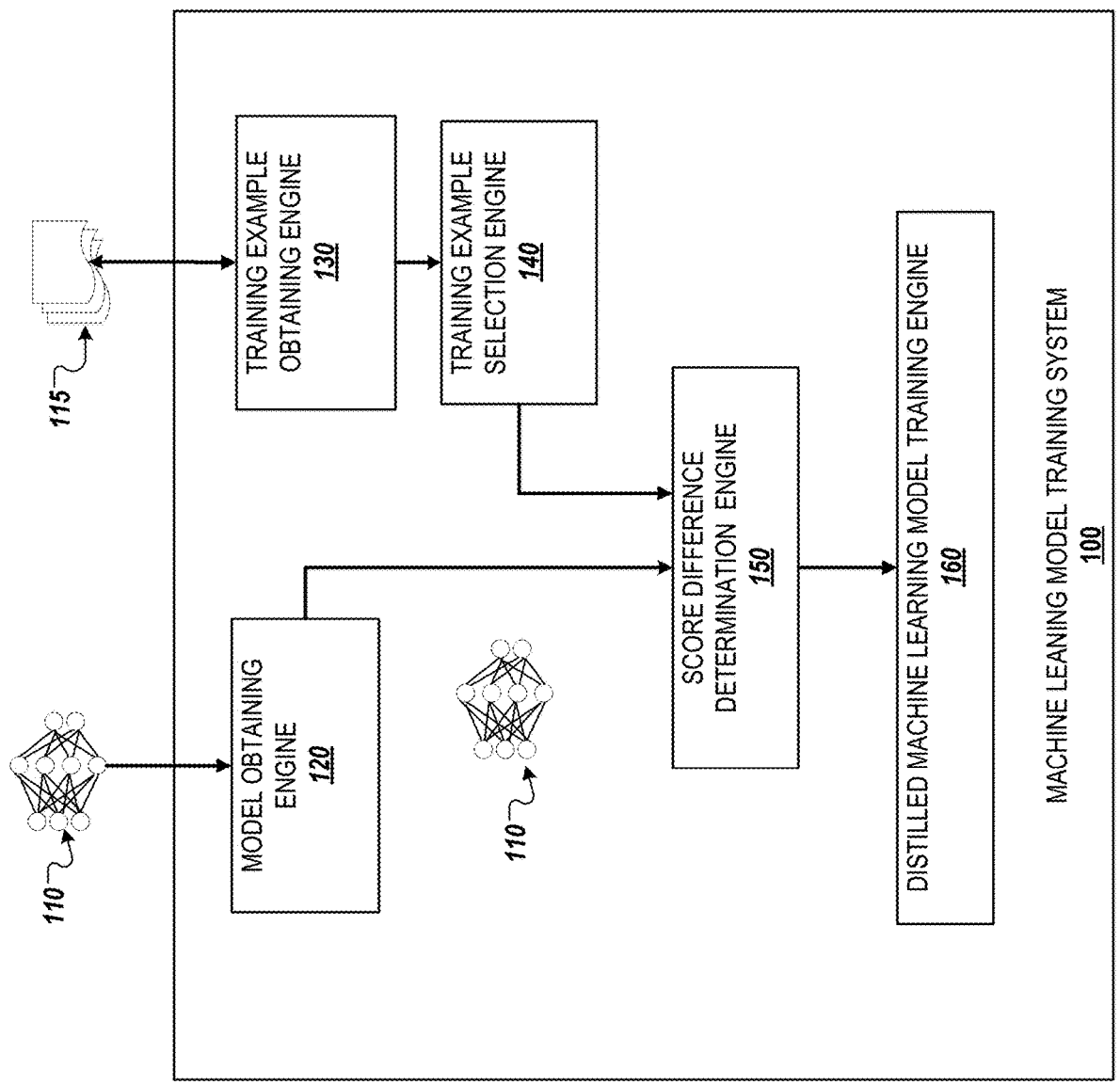
FIG. 1 is a diagram of an example system for training machine learning models using ranking distillation.

Knowledge distillation can be used in deep learning when there are limitations, including limits on complexity, architecture, training dataset sizes, etc., on the model that is to be deployed. A complex teacher model is trained, and its predictions are used to train a simpler student model, which can then be deployed in a resource-constrained environment. (Regarding terminology, for brevity, the teacher model can be referred to as "teacher" and the student model can be referred to as "student." Similarly, a signal produced by evaluating the teacher model can be called a "teacher signal," training the student model can be called "student training," and so on.)

Both models can be trained to optimize the same general objective. However, when deployed, the student model is limited in various ways, which can include available computing resources, the amount of data it trains on, the permitted model architecture, and by deployment system requirements that may not allow some signals (or features) to be considered by the deployed model. The teacher model typically has no such limitations, and the added flexibility allows it to achieve more accurate predictions.

For brevity, the student model may be referred to as the student, and the teacher model as the teacher. The student can train only on the teacher's predictions or beliefs, or on both the teacher's beliefs and the true labels. The training can leverage the additional information encoded in the teacher's signal from training data that the student model cannot observe directly due to resource constraints. The student training can also attempt to capture as much of the projection of the signal from dimensions (or features) that it cannot access, but that the teacher can, by projecting these signals to its own (that is, the student's) feature space. This technique requires the student to leverage its own misspecification uncertainty to distributions of predictions that are provided by the teacher, as described below. The teacher provides such distributions through dimensions of features that the student does not have. According to the teacher, some examples are different, yet they appear identical to the student because the student can access only a subset of the features. For example, if the teacher has access to examples with feature vectors (where features are enumerated) containing values $\{1, 2, 3, 4, 5, 6, 7\}$ and $\{1, 3, 5, 7\}$ and the student has access only to the first, third, fifth and seventh feature values in both examples, the student will perceive both examples to have the same feature values, that is, $\{1, 3, 5, 7\}$. Thus, while the teacher will recognize these examples to be distinct, they will look identical to the student. The techniques described in this specification can be used to determine a loss used by the student such that the student provides accurate predictions for families of examples similar to the example described above. This specification describes pairwise ranking losses, and the techniques can be used for direct individual example pointwise losses.

To take advantage of the teacher's knowledge despite the student's misspecification due to lack of some features, distillation objectives (or losses) can be designed to average misspecification of the student over a distribution of predictions provided by the teacher. An accurate determination of distillation loss is important to determining accurate predictions, as different losses can push the student to produce different predictions on the same distribution of teacher's predictions. An accurate determination of loss can thus improve the rate in which the student converges to its best possible predictions by relying on the transfer of knowledge from the teacher. For logistic regression loss, distilling in logits with square (L2) loss can have advantages over distilling in probabilities due to the strong convexity of the loss, which leads to faster rate of convergence to the best predictions the student can provide. This provides a technical advantage that fewer computing resources (e.g., CPU cycles) are required, because the student can train on fewer data examples to achieve the same accuracy. Square loss, however, is very sensitive to outliers as well as to flat optima. Applied on logits, square loss will not, in some cases, push the student model towards the best minimum for logistic regression. This minimum occurs at the mean in probability, whereas square L2 loss on logits pushes the student towards the mean in logit, which may not overlap with the mean in probability.

As described in this specification, using L1 regression, which is an example of median loss, or more generally, Quantile Regression (QR), addresses the sensitivities of square L2 loss, and is also robust to the functional form of the empirical distribution. On the other hand, it can push the model towards either the median (or other quantiles) of the teacher's predictions on examples that appear identical to the student, instead of the mean, as described further below. If the mean and median do not agree, this difference can affect performance.

L1 and QR regression objectives can be considered either on the logit prediction values or on the actual label probabilities predicted by the model. Depending on the specific application's dataset, a loss can be chosen, either using L2 loss on logits and L1 regression or QR. For logistic regression, L2 pushes towards the logit mean, and L1/QR pushes towards the median. The design can select the loss that pushes towards the statistic (e.g., median) closer to the mean in probability. Alternate approaches, described later in this specification, can push the solution even closer to the mean in probability.

One context in which distillation can be used is in recommender systems. Recommender systems attempt to determine, from among a group of items, which item or items to recommend. When multiple items are recommended together, the recommender system can also recommend an order of the items. Importantly, the ranking of the items can depend on the other items that are co-recommended. In systems that select recommendations from a huge repository of items (e.g., containing millions or billions of items), it can be advantageous to perform inference and ranking in two phases: an initial phase that selects the items to recommend, and a second phase that ranks the items. Notably, the second phase can use the information about co-recommended items when performing the ranking.

Training recommender systems can attempt to optimize more than a single objective. For example, recommender models can produce both a predicted score for each recommended item and a ranking of the recommended items. While the model must generate accurate label predictions, ranking the items can be equally important or even more important than the specific predicted scores. When all features are correctly specified, there should not be differences between the order of the predicted scores and the predicted rankings. Optimizing for cross entropy loss can improve prediction accuracy and ranking accuracy.

However, models are not typically correctly specified, as the recommender system typically cannot access the features in nature that determine the real label. Instead, hand-crafted features, for example, selected by a system designer, attempt to model real processes, but are often only approximations and are of varying quality. Furthermore, since it becomes computationally infeasible to model all pairs or lists of items due to the large number of examples, systems typically train on individual examples, and not always on sets of individual examples—that is, the items that will be recommended together, As noted above, relevant information can be provided by the interaction among items in a set of examples, and not only for each example by itself. Systems that are incapable of training on the full set will not capture this information.

To overcome the misspecification in a model to produce more accurate ranking, some systems use pairwise or listwise signals that constitute a ranking-specific loss for example sets that are shown together in recommender systems, e.g., as a result of some query. The pairwise approach takes a pair of examples, one with a positive label, and the other with a negative label, and considers cross entropy loss on the label. The label of the cross-entropy loss can be defined as "item A has a better label than item B." In the binary case, the label is positive if item A has a positive label and B has a negative one, and is negative when A has a negative label and B has a positive one. Pairs with ties can be excluded from the loss or a mid-level label can be used. For example, if 0 and 1 labels are used, then ties can be assigned the label 0.5. When extending this approach to distillation, labels can be defined as (logit) score differences between items in a pair. When training the student, teacher score differences of a pair can be used as labels for student differences. For logistic regression, this can be performed either in logit space on the raw logit scores, or in probability space on the actual prediction probabilities. When performed in probability, the logistic (Sigmoid) of the logit score differences can also be used. Distillation can be performed either for all pairs, or only for pairs whose true labels are not equal. Distillation can also be generalized to occur once for the list of examples in an example set. Whether direct cross entropy loss is used or distillation, the pairwise losses encourage misspecified features towards improving ranking. If combined with direct cross entropy loss (and/or distillation for accuracy on the actual labels), adjustment can be made to tune between the losses to balance between prediction accuracy and ranking objectives. Empirically, in practical systems, the ranking methods have improved ranking substantially, with rather minor effects on prediction accuracy.

In summary, this specification describes how ranking distillation can be performed using L1 regression, quantile regression, and modifications to each of the two, on pairwise score differences to leverage the extra signal and information of the teacher to improve ranking prediction performance of the student. This approach is less sensitive to outliers than using square loss, but much more powerful (with faster convergence, thereby using fewer computing resources) than using cross entropy losses. This specification further describes an approach that combines square loss with L1 and QR regression, providing additional improvements to model training.

FIG. 1 is a diagram of an example system 100 for training machine learning models using ranking distillation. The system 100 can include a model obtaining engine 120, a training example obtaining engine 130, a training example selection engine 140, a score difference determination engine 150 and a distilled machine learning model training engine 160.

The model obtaining engine 120 can obtain a trained machine learning model, specifically, a teacher model, from a machine learning model repository. In some implementations, the model obtaining engine 120 can obtain the machine learning model by obtaining a pointer to the model. The pointer can be a reference to a memory location (sometime called a "memory pointer"), a reference to a storage location (e.g., the fully-qualified name of a file in a file system) or a reference to a network location (e.g., a Uniform Resource Locator, or URL). The model obtaining engine 120 can obtain the pointer by providing an Application Programming Interface (API) through which a user can supply the pointer. In some implementations, the model obtaining engine 120 can obtain the pointer by retrieving it from a known location, such as file that is stored at a location configured into the system 100. The training machine learning model can be any appropriate type of model, such as a feed-forward neural network or a residual neural network. In some implementations, the model obtaining engine can obtain stored predictions produced by a teacher model when evaluating training examples instead of, or in addition to, obtaining the model.

The training example obtaining engine 130 can obtain training from a training example repository. In some implementations, the training example obtaining engine 130 can obtain the training examples by obtaining a pointer to the location at which the training examples are stored. The pointer can be a reference to a memory location (sometime called a "memory pointer"), a reference to a storage location (e.g., the fully-qualified name of a file in a file system) or a reference to a network location (e.g., a URL). The training example obtaining engine 130 can obtain the pointer by providing an Application Programming Interface (API) through which a user can supply the pointer. In some implementations, the training example obtaining engine 130 can obtain the pointer by retrieving it from a known location, such as file that is stored at a location configured into the system 100. In some implementations, the training example obtaining engine can obtain examples together with predictions which were provided for these examples from a teacher model.

Each training example can contain a set of N feature values and can include one or more outcome labels (l), e.g., $\{v_1, v_2, \ldots v_N, l\}$. If there are M training examples, the training example can be stored in a collection, such as $\{E_1, E_2, \ldots, E_M\}$. The full collection can be represented as a matrix of M training examples (rows), where each row contains a training examples, such as the matrix illustrated in Listing 1, below.

Listing 1

$\{v_{11}, v_{21}, \ldots, v_{N1}, l_1\}$

Listing 1

$$\{v_{12}, v_{22}, \ldots, v_{N2}, l_2\}$$
$$\ldots$$
$$\{v_{1m}, v_{2m}, \ldots v_{Nm}, l_m\}$$

Each feature value can be a number (including real values, integer values, etc.), a character, a string, a Boolean or any other data type. In some implementations, the label is a real number, although other data types are permitted. Similarly, while Listing 1 illustrates only a single label, training examples can include multiple labels. In the binary case, labels can be 0 and 1. In some implementations, the examples can be ordered, for example, chronologically.

The training example selection engine 140 can train on all example groups from among the training examples, or only on groups in which there are opposite labels. Training example groups align with the groups recommended together by the recommender systems, which can recommend groups of items, and also recommend an ordering of the recommended items. A training example group can contain one or more training examples. The training example selection can train on all pairs in a group of training examples, or select to train only on pairs which have unequal labels.

The training example selection engine 140 can then create training example pairs which contain pairs of training examples from a training example group. In some implementations, the training example selection engine 140 creates training example pairs for all pairs of training examples within a training example group. For example, if a training example group contains examples $\{E_1, E_2, E_3\}$ then the system can create training example pairs with $\{E_1, E_2\}$, $\{E_1, E_3\}$ and $\{E_2, E_3\}$.

The score difference determination engine 150 can compute the score differences among the training example instances in the training example groups. In some implementations, the score differences can be computed pairwise. For example, the system can use the teacher machine to compute a score for a first example, and a score for a second example, and compute the difference between the scores.

The score difference can be the difference between predicted scores, the difference between predicted probabilities, a probability determined as the logistic (or Sigmoid) function of predicted score differences, among others. The score difference can also be the difference in rankings between the training examples. In some implementations, the system computes multiple score differences, for example, predicted score differences and ranking differences. In some implementations, the system applies an absolute value to the score differences.

The distilled machine learning model training engine 160 can train a student model using all of or some of the training examples. The student may have available all of or some of the features available to the teacher but, in some cases, will not have access to all of them, all of or some of the training example groups, or any combination thereof. Due to limited computing resources at the device evaluating the student model, the student model can: (i) have only limited complexity, (ii) may not have trained on all the information originally available, or (iii) both.

As described herein, knowledge distillation can be used to simplify the student model, and since ranking loss is important in recommender systems, this specification largely describes distillation of ranking loss, as described in further detail below, although the techniques described herein can also be used for pointwise distillation approaches. However, the techniques described in this specification can also be used for direct label loss distillation, and applied to L1, QR or other variations described herein.

Figure 2:
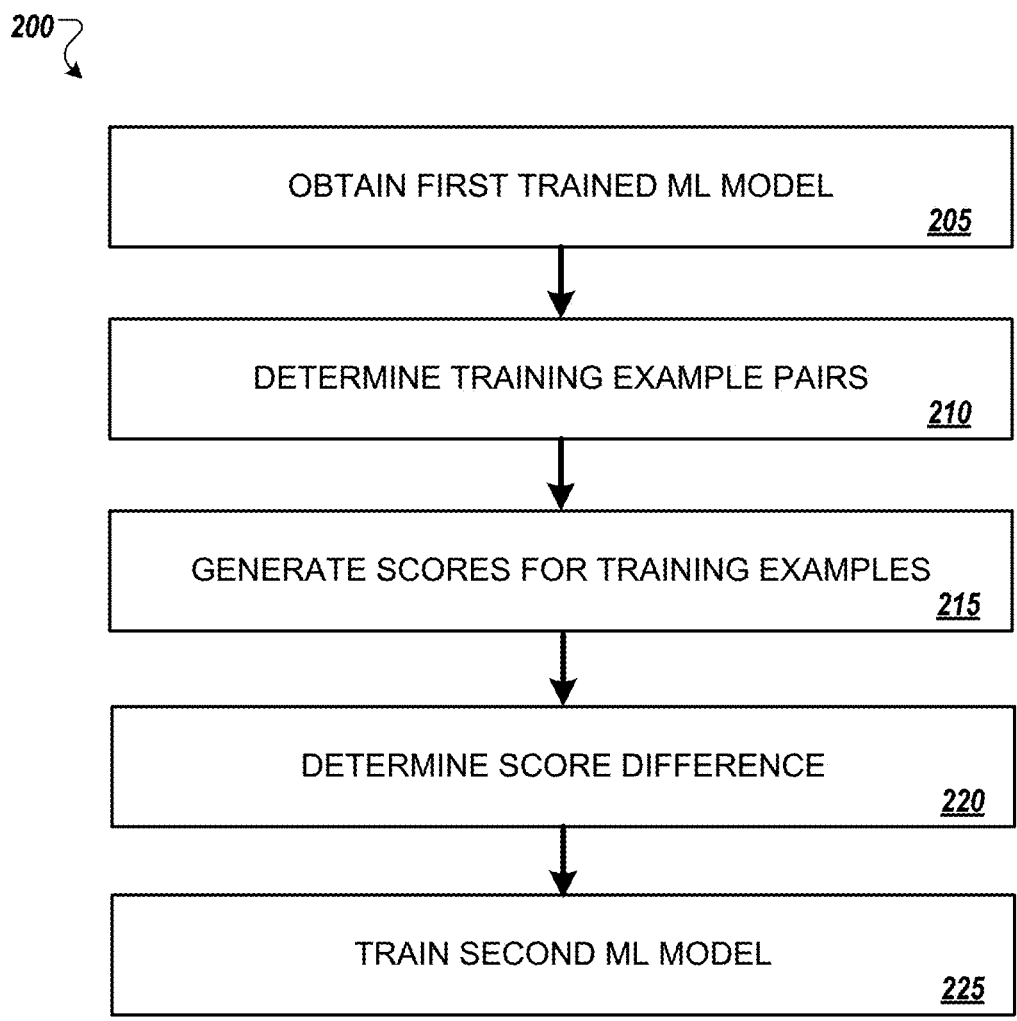
FIG. 2 is a flow diagram of an example process for training machine learning models using ranking distillation.

Training is described in additional detail in reference to FIG. 2. The result is a trained distilled machine learning model.

FIG. 2 is a flow diagram of an example process 200 for training machine learning models using (distillation and) ranking distillation. For convenience, the process 200 will be described as being performed by a system training machine learning models using ranking distillation, e.g., the system for training machine learning models using ranking distillation 100 of FIG. 1, appropriately programmed to perform the process. Operations of the process 200 can also be implemented as instructions stored on one or more computer readable media which may be non-transitory, and execution of the instructions by one or more data processing apparatus can cause the one or more data processing apparatus to perform the operations of the process 200. One or more other components described herein can perform the operations of the process 200.

The system obtains (205) a first trained machine learning (ML) model which can serve as the teacher model. Alternatively, it obtains a link to predictions of the teacher model on examples it is about to train on. The first ML model can be a teacher ML model that has been trained on training examples. The system can obtain the model by retrieving it from a storage location. For example, if the model is stored on a web server, the system can obtain the teacher model using Hypertext Transfer Protocol (HTTP). In another example, if the model is stored in a file system, the system can obtain it using conventional file system APIs. If the model is stored in computer memory, the system can obtain the model using a pointer to the memory location. The pointer to the memory location can be configured into the system.

The first trained ML model is configured to output a score and has been trained on a plurality of training examples that each include feature values that represent features of an item, and an outcome label for the item. The score can be a prediction, e.g., the likelihood that a user will interact with a recommended component, a predicted ranking of a recommended component as compared to co-recommended components, or combinations of predictions and predicted rankings. The training examples can include feature values relating to a recommended component and the outcome can indicate whether the user interacted with the component.

The system determines (210) training example pairs from the training examples. As described above, in some implementations, the system obtains training examples that are organized as training example groups, where each training example group has a commonality, e.g., the training examples have been co-recommended. From the training example groups, the system can create training example pairs, each containing two training examples—that is, a first training example and a second training example. As described above, the system creates training example pairs by taking all pairs of training examples for the training examples in the set, or taking only example pairs with unequal labels. For example, if there are N training examples in a training group (called TrainingGroup), to create training pairs for that groups, the system can use the method illustrated in Listing 2, below.

Listing 2

```
For i=1 to N:
    For j=(i+1) to N:
        AddPair (TrainingGroup_i, TrainingGroup_j)
```

The system generates (215) scores for each training example and for each included training example pair. Note that, in some implementations, pairs that have the same outcome are excluded, so in some implementations, the included training pairs include all training example pairs and in some implementations, the training example pairs include only pairs with different outcomes. As noted above, each training example can include feature values and one or more labels that indicate an outcome or a ranking produced by the training example. For each training example in a training example pair, the system can process an input that includes or encodes the feature values using the teacher model to produce an output. The input can also include a description of the other training example in the pair. The output can include one or more scores that represent the likelihood of a positive outcome, a predicted ranking, and other scores and rankings.

In some implementations, training examples can be organized into training example groups that contain multiple training examples, and the ML model can be configured to produce both scores for the training examples in the training example groups, and rankings of the training examples in the training sets, as described above. In such cases, the system can process an input that includes or encodes at least a subset of the feature values of the training example using the teacher model to produce an output.

The system determines (220) score differences for the outputs of the teacher's training examples. The system can compute the difference by subtracting a score associated with the first training example from a score associated with the second training example. In some implementations, the systems can compute a difference by subtracting the square of one score from the square of a second score. Other differences can also be computed. In some implementations, differences can be computed on logit scores, predicted probabilities, and by taking probability (with the Sigmoid function) of a logit score difference.

The system trains (225) a second ML model. The system trains the student model using past example sets that contain labeled examples, as described above. The system trains the student model by using the student model to process the feature values in examples to produce one or more scores that reflect the predictions of the student model, and using the produced scores and the label(s) to generate loss values, as described in greater detail below. The system can then use the loss values to train the student model, for example, using backpropagation. The training can cease when, for the same training examples, the difference between the score differences produced by the teacher model and the score differences produced by the student model are within some threshold value or when a configured number of training iterations have been completed. The training can be based, at least in part, on one or more quantile loss functions that receive as input one or more of the score differences, as described in further detail below.

However, in some cases, predictions relating to individual items might not agree with predictions relating to rankings. For example, a model's prediction for item $I_1$ might be higher than the model's prediction for item $I_2$, but the recommended ranking for $I_2$ might be higher than that for $I_1$ in a given set of recommendations.

To improve the results when ranking and label predictions may not agree, the system can train the student model with two different losses. One loss, cross entropy loss on the individual examples, can improve label (marginalized) prediction accuracy for any of the specific examples. The other loss, a ranking loss, can improve ranking among different examples that appear together in an example set, as well as improve the choice of which examples make it to the displayed results. The techniques described in this specification can, in some implementations, combine both types of losses—that is, cross-entropy label loss and a ranking loss.

Quantile and L1 Regression

Equation 1 illustrates the computation of quantile loss. $y_t$ is the label of the $t_{th}$ example and q is τ's quantile in the distribution of labels. The quantile loss for example t for quantile describing τ probability of a distribution with label $y_t$ and quantile prediction q is given by:

$$L_t(\tau, y_t, q) = (1-\tau)I(y_t < q)(q - y_t) + \tau I(y_t > q)(y_t - q) \quad (1)$$

Where I( ) is the indicator function, and q and $y_t$ can be in the domain defined for the labels. For logistic regression, the labels can represent either logit values or probabilities predicted for a label. Note that if τ=0.5, the loss over the examples is minimized at the median value of the distribution of y, and optimization of q gives that median. Such optimization is equivalent to L1 regression, where the loss at iteration t is defined as in Equation 2, below:

$$L_t(y_t, q) = |y_t - q| \quad (2)$$

In Equation 2, q is the learned weight from the labels $y_t$. Quantile regression can be used with multiple losses to compute different quantiles of the label distribution, resulting in different values of q for different values of τ.

Because the median does not directly depend on the gradient at the optimum, L1 regression and QR can be applied even without a specific functional form of the distribution of y, and can be more robust to situations where the distribution of y is flat around the mean. Furthermore, L1 and quantile regressions are more robust to outliers than square loss, especially when trained in combination with gradient methods, since the gradient away from the optimum does not increase with the distance from the optimum. This property can reduce the impact of outliers, but can also result in slower convergence.

In addition, L1 regression produces a symmetric loss around the optimum, unlike logistic regression, for which the loss decays to 0 on one side and increases asymptotically linearly on the extreme of the other side (following a Softplus function shape). Thus, QR or L1 losses allow distillation with a loss symmetric around the mean which is not as sensitive to outliers as L2 losses.

Quantile Distillation for Label Loss

The system can use QR for distillation where the student attempts to match the quantiles of the teacher for the teacher's predictions. In such cases, the student model includes at least as many outputs as the number of quantiles used, and the model learns these outputs using the labels provided by the teacher, as illustrated in FIG. 3.

Figure 3:
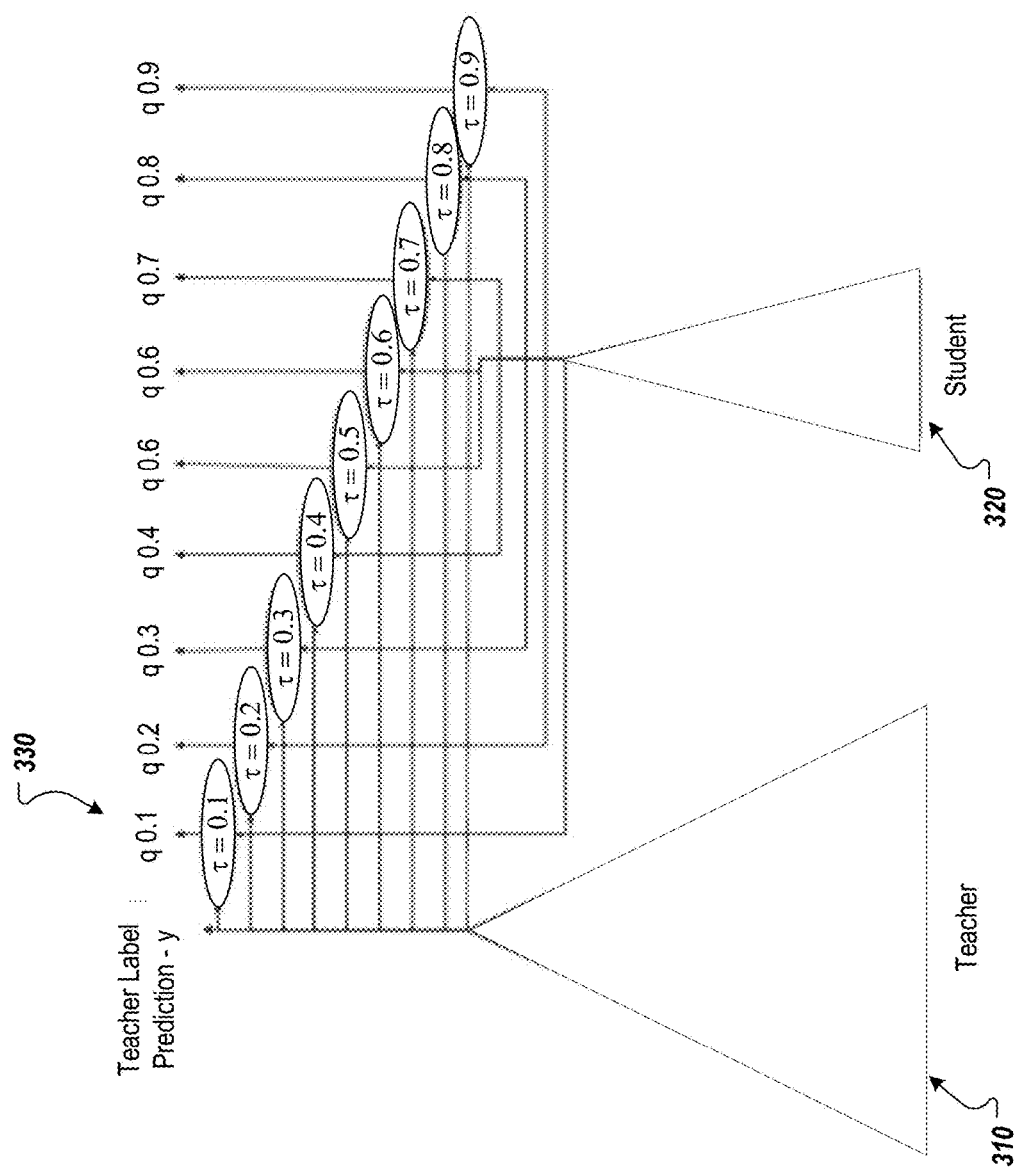
FIG. 3 shows quantile distillation with deep teacher and student networks with nine quantiles.

FIG. 3 shows quantile distillation with deep teacher 310 and student 320 networks with nine quantiles (e.g., 330). The teacher label y is used to compute a QR loss using Equation 1, and for each quantile, q is learned using inputs from the student network. Lines outputted from the student can consist of a single weight multiplier and a bias, or of a full layer or network of weights and biases, which produce a single output that enters a quantile loss unit (denoted by a value of r).

As further shown in FIG. 3, the student network 320 learns the quantiles of the teacher's predictions. In some implementations, the input to each quantile loss can come directly from the student's output, as shown in FIG. 3. In some implementations, different signals or layers in the student can be used to provide inputs for each of the quantile losses. More or fewer quantiles can be used, and if only a single quantile, $\tau=0.5$, is used, the approach reduces to L1 regression distillation.

Note that, in addition to the student learning the teacher's predictions, since the student also learns the quantiles, additional training benefits arise. Specifically, as noted above, the teacher may have a distribution of predictions on examples that appear identical to the student. For a family of such examples, by matching the teacher's quantiles at its output, the student internally learns towards a representation of the median of this distribution, as described above.

Ranking Distillation

As described above, optimizing for ranking in recommender and other systems, in addition to optimization for cross entropy or for other losses on the actual labels, can be useful to leverage model misspecification to improve ranking. The teacher model's knowledge about examples can be used to train the student model. Training can be performed directly by distilling the teacher's predictions or the teacher's scores as labels on which the student trains. In addition, training can be performed using ranking. If $s_i$ and $s_j$ are the logit scores of the student model for two examples (i and j) in a set and $t_i$ and $t_j$ are the logit scores of the teacher model for the two respective examples, the system can use difference signals, such as $s_i-s_j$ and $t_i-t_j$, for distillation, instead of, or in addition to, the individual predictions. This technique can eliminate effects of features common to both examples in the pair (such as query specific features) from the optimization, focusing it only on features that influence the difference in predictions between the two examples. The square (L2) distillation loss is then given by Equation 3, below:

$$L_{ranking\text{-}distillation} = \Sigma_{i=1}^{N} \Sigma_{j=1, j \neq i}^{N} [(t_i - t_j) - (s_i - s_j)]^2 \quad (3)$$

The loss given in Equation 3 can be applied for every example set. In some implementations, to improve ranking and to reduce computational burden, pairs which have the same true labels can be excluded from the loss computation.

As described below, the difference signal can be used with QR or L1 regression for distillation. The probabilities predicted by each of the models can be denoted as shown Equation 4, below.

$$p_i^t = \sigma(t_i) \triangleq \frac{1}{1+e^{-t_i}}, \; p_i^s = \sigma(s_i) \triangleq \frac{1}{1+e^{-s_i}} \quad (4)$$

$$p_{ij}^t = \sigma(t_i - t_j) \triangleq \frac{1}{1+e^{(t_j - t_i)}}, \; p_{ij}^s = \sigma(s_i - s_j) \triangleq \frac{1}{1+e^{(s_j - s_i)}}$$

The function $\sigma$ is the Logistic (Sigmoid) function, the superscript t denotes the teacher's predictions probabilities and s denotes the student's prediction probabilities. Each probability in Equation 4 denotes the probability of a positive label. The probability $p_{ij}$ is the probability that example i in the set has a positive label while example j has a negative one.

Combining Ranking with Quantile Regression for Distillation

To combine rankings with quantile regression for distillation, a technique similar to that illustrated in FIG. 3 can be used, but instead of applying the technique to a single example label, it is used on differences between pairs of examples in the same example set, where the difference can be the score difference, probability difference, or probability of the score difference, among others. This technique can apply when there is a single or multiple quantiles. Following Equation 1, the QR loss for logit scores for each quantile $\tau$ is given by Equation 5, below.

$$d_t \triangleq t_i - t_j, d_s^\tau \triangleq s_{\tau,i} - s_{\tau,j}$$

$$L_{ij}(\tau, d_t, d_s^\tau) = (1-\tau)/(d_t < d_s^\tau)(d_s^\tau - d_t) + \tau/(d_t > d_s^\tau)(d_t - d_s^\tau) \quad (5)$$

Where $s_{\tau,i}$ denotes the student logit score for output head $\tau$ for example i, $d_t$ is the difference signal for the pair of examples (i, j) for the teacher, and $d_s^\tau$ is the difference signal of the student for quantile head $\tau$ on the pair of examples (i,j).

In a similar manner, if the difference signal is defined on the predicted probabilities of both teacher and student, the result is illustrated in Equation 6, below.

$$d_t \triangleq p_i^t - p_j^t$$

$$d_s^\tau \triangleq p_{\tau,i}^s - p_{\tau,j}^s \quad (6)$$

The same loss from Equation 5 can be applied to determine a QR loss directly on the predicted probabilities of both models. Finally, the loss on the probability that example i has a better label than example j (e.g., the label for i is positive and the label for j is negative) can be defined directly, as illustrated in Equation 7, below.

$$d_t \triangleq p_{ij}^t$$

$$d_s^\tau \triangleq p_{\tau,ij}^s \quad (7)$$

In all cases, the $\tau$ subscript can be used for the $\tau$'s output of the student model. Due to the monotonicity of the Sigmoid, the losses in Equations 5 and 7 will be optimized with the same median value. However, gradients that propagate to the student network may be different for a given example due to the Sigmoid, giving a different curve for the loss, yielding different convergence rates to the optimum.

As in single example QR distillation (that is, predictions from single examples are scored instead of prediction differences of pairs of examples), a single quantile $\tau=0.5$ can be used to optimize to the median identically to L1 regression, in all three cases of difference scores as defined in either equations (5), (6) or (7). The L1 regression loss in this case is given by Equation 8, below.

$$L_{ij}(d_t, d_s) = |d_t - d_s| \quad (8)$$

In Equation 8, $d_s$ is the student difference signal.

As described above, QR or L1 regression loss can be applied to differences of all example pairs in an example set, or it can be applied only on pairs of examples whose true labels are different.

Figure 4:
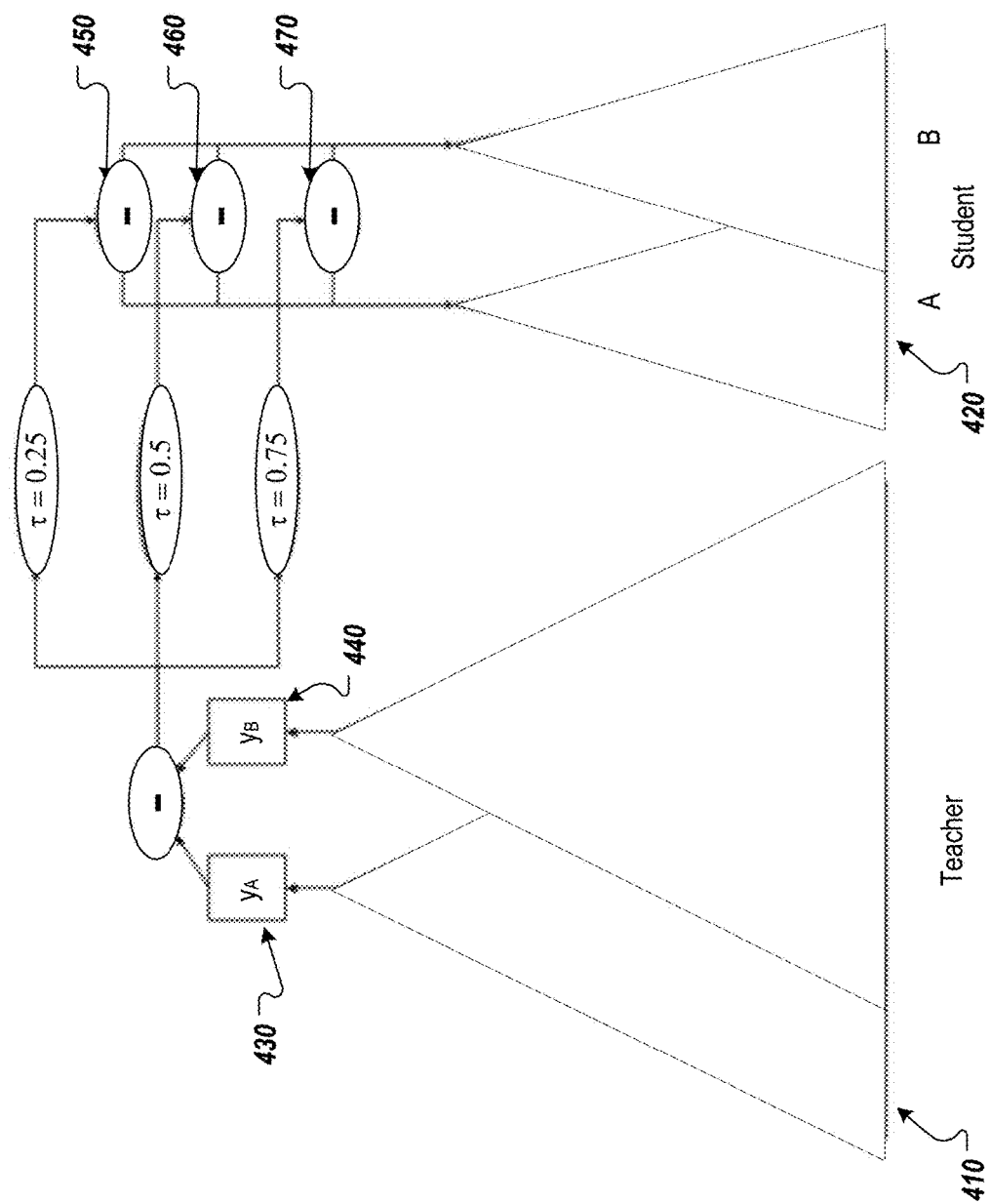
FIG. 4 shows a teacher and a student where each student quantile output learns a multiplier (and a bias) over its top prediction to predict the quantile difference component signal.

FIGS. 4 and 4 illustrate QR ranking distillation with three quantiles for a pair of examples in an example set. FIG. 4 shows a teacher 410 and a student 420 where each student quantile output learns a multiplier (and a bias) over its top prediction to predict the quantile difference component signal. The figure shows QR ranking distillation with three quantiles {0.25, 0.5, 0.75} for a pair of examples (A, B) in an example set. The difference teacher prediction signal, taking the difference between 430 and 440 (either logit or probability) for the pair is used in three quantile losses against student heads 450, 460, 470 that forward propagate the three quantile differences for each of the difference quantiles. Then, backpropagation (in the direction of the arrows) propagates the quantile losses to the student network for each of the examples in the pair. The "–" operator produces either logit score difference, predicted probability difference, or probability (Sigmoid) of the logit score difference. Lines going out of the student contain at least a single learned multiplier (and can include a bias) for each path to a "–" operator.

Figure 5:
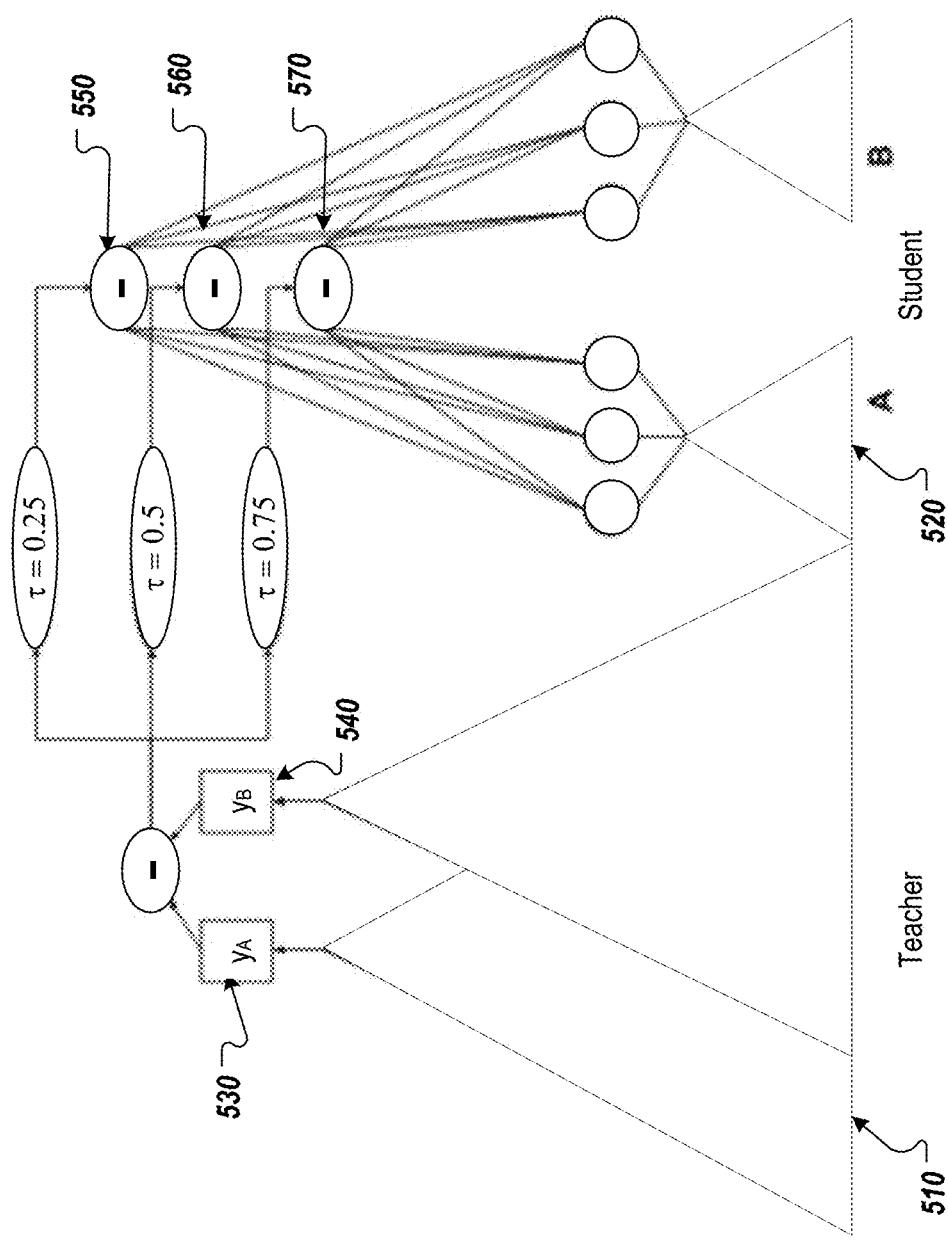
FIG. 5 shows a teacher model and a student model, and each quantile output learns multiple weights connected to a layer of the student network (with possibly additional bias) to predict a quantile component signal.

FIG. 5 again shows a teacher model 510 and a student model 520, and each quantile output learns multiple weights connected to a layer of the student network (with possibly additional bias) to predict a quantile component signal. The figure shows QR ranking distillation with three quantiles {0.25, 0.5, 0.75} for a pair of examples (A,B) in an example set. The teacher model 510 produces outputs 530, 540. FIG. 5 is similar to FIG. 4, except that the signal used as input for each difference in each quantile learns distinct weights and biases to a top layer of the student (i.e., for each quantile there is a separate network with a separate "head" 550, 560, 570 with a separate vector of weights leading from the network to that head for each quantile).

In some implementations, the configuration shown in FIG. 4 is sufficient to train the student model, specifically when the network can code the relation information whether it needs to learn a single or multiple weights to distinguish among the different quantiles. The configurations shown in each of the figures can represent all three forms of signal on which QR is performed (logit differences, probability differences, or probability of logit differences).

Quantiles vs. Median (or L1 Regression)

The signal into the quantile losses may be shared across different quantiles. This signal can influence the multiple quantile losses in the student network. From the perspective of a learned unit (input, embedding, hidden layer weight or bias (for deep models)) or of a subnetwork in the student network, if the unit is connected to all quantile loss heads, that unit learns a superposition of all the quantile losses. Thus, the aggregate loss on a subnetwork of units in the student network connected to all quantile losses is a sum of the quantiles losses. Such losses can be viewed as a sum of quantile losses as defined in Equation 1, where q is fixed to the quantiles of the teacher (which are implicitly learned by the student), but $y_s$ (which now represents the output of the student subnetwork, or at least its belief) is learned. This implies that a matched loss curve that aggregates all quantiles is the curve that is optimized by the subnetwork or network. If symmetric quantiles are assigned around the τ=0.5 quantile, the aggregate loss becomes a piecewise linear continuous curve, with minimum at the median of the teacher's predictions (on examples that appear similar to the student, as described above). Therefore, L1 regression (or QR with τ=0.5) can be applied to optimize towards the median. The advantage of using multiple quantiles is smoothing the loss curve relative to that of L1 regression, which can improve numerical stability. In both cases, however, optimization tends to push the label belief of the student towards the median. (Note that, as shown later in this specification, smoothing a curve for a specific quantile in the ensemble of quantiles has the effect of moving the minimum towards the mean, which is different from the effect of multiple quantiles. This effect occurs only when the mean and the median differ.) The optimization towards the median changes if QR is set with asymmetric quantiles. In such cases, the minimum is determined by the superposition of the considered quantiles. Furthermore, disjoint units connected to disjoint sets of quantiles can lead to different interpretations of the overall QR losses, not necessarily optimized at the median.

Figure 6:
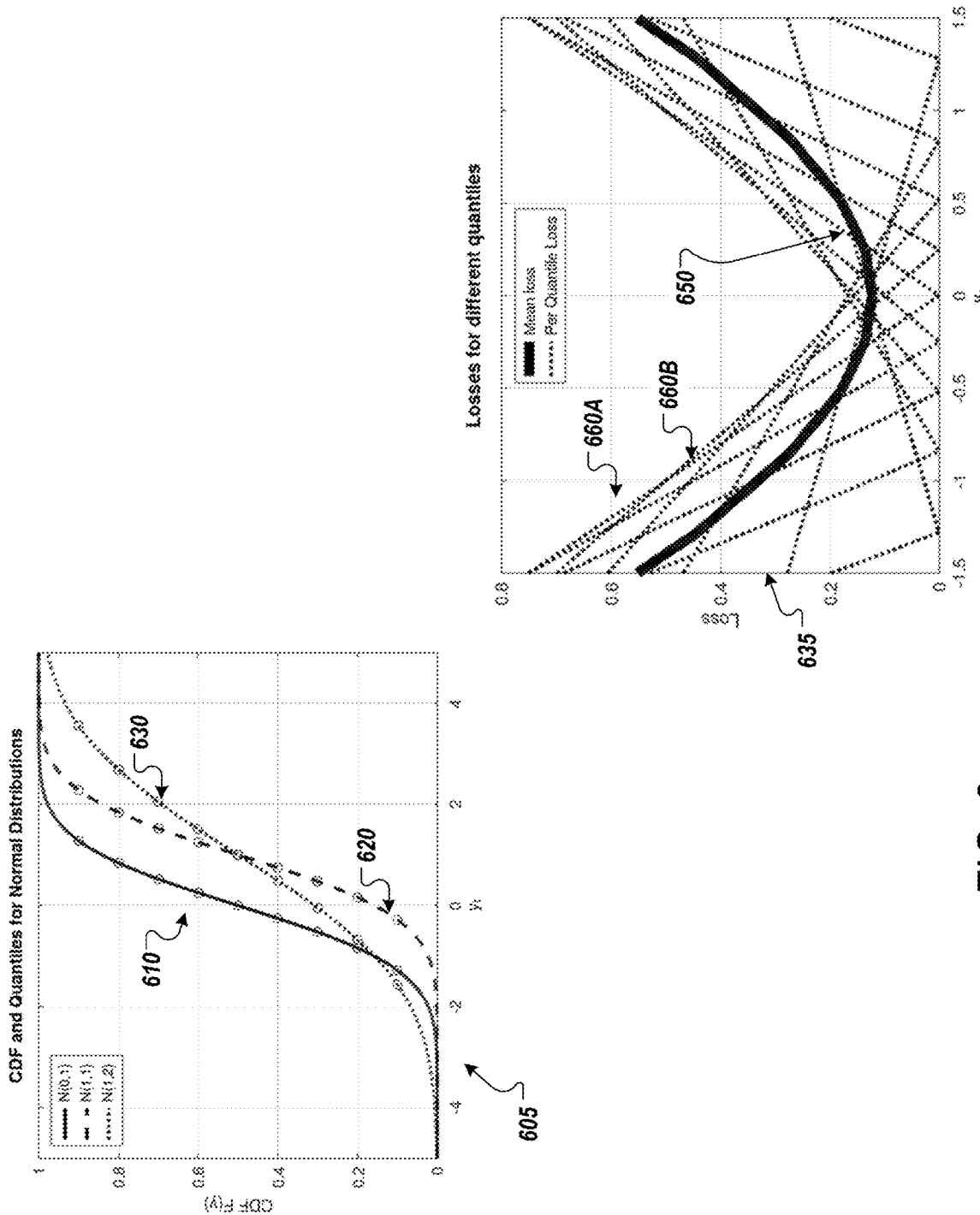
FIG. 6 illustrates how the quantile loss with fixed choices of quantiles for normal teacher distributions is reflected on the learned student belief.

FIG. 6 illustrates how the quantile loss with fixed choices of quantiles for normal teacher distributions is reflected on the learned student belief $y_s$. Graph X405 illustrates Cumulative Distribution Functions (CDFs) with nine quantiles of three normal distributions: standard N(0,1) 610 with mean 0 and variance 1, N(1,1) 620 with mean 1, and N(1,2) with variance 2 630. Graph 635 illustrates the loss curves (e.g., 640A, 640B) for nine quantiles of the standard N(0,1) normal distribution, and the aggregated mean loss over the 9 quantiles (650) as function of the student prediction label y_s. For the standard normal CDF 650 with 0 mean and variance 1 shown on this graph, that loss is a piecewise linear loss that attains a minimum at the median 0 of the distribution (which equals the mean in this case). Thus, if the teacher's signal is normally distributed, applying the mean quantile loss over the nine teacher quantiles pushes the student label prediction to an optimum at the median, similarly to applying L1 regression on $y_s$ towards the teacher's predictions $y_t$.

Figure 7:
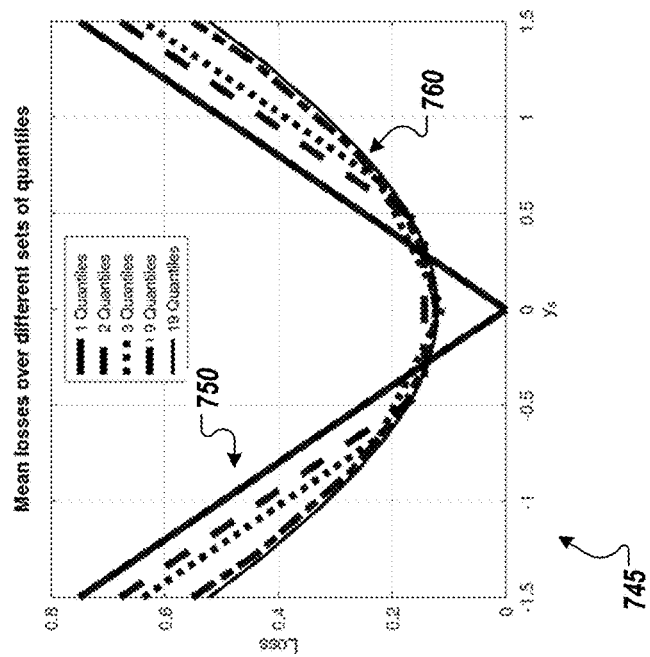
FIG. 7 demonstrates the behavior of the aggregate mean loss with nine quantiles for the different distributions.
Figure 7:
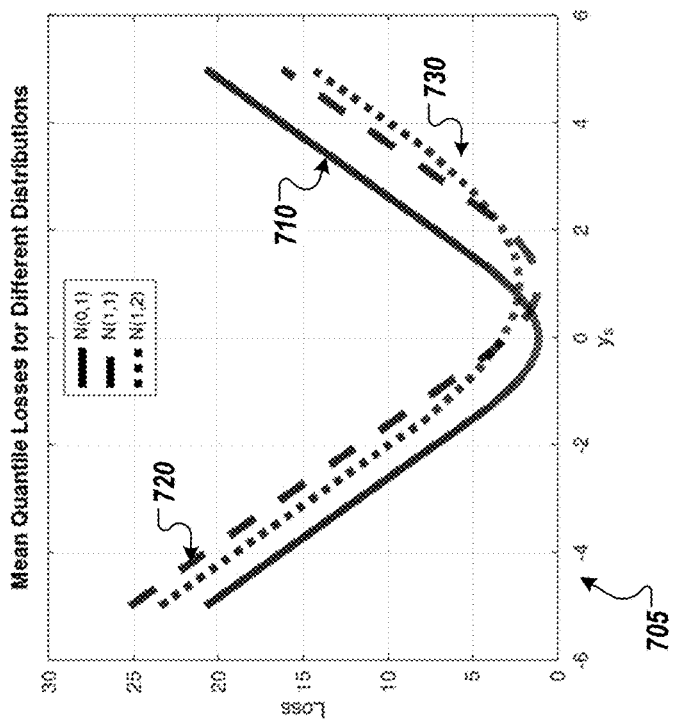

FIG. 7 includes graph 705 which demonstrates the behavior of the aggregate mean loss 710, 720, 730 with nine quantiles for the different distributions in FIG. 6A. Graph 745 illustrates the aggregate mean loss for different sets of quantiles applied to the loss (e.g., 750, 760) for a teacher with predictions obeying a standard normal distribution. From graph 705, it is apparent that in all cases the optimum is at the median (or mean for symmetric cases). In graph 745, losses are shown for different sets of symmetric quantiles, that is, the vector of quantiles for which losses are included contains both τ and 1–τ.

The loss graphs shown in FIGS. 6A and 7 illustrate the loss which the student would incur relative to the full teacher distribution (coded by its quantiles or median) if the student belief of the label score is $y_s$. However, there is no direct pointwise relation between the student prediction $y_s$ and that of the teacher $y_t$ for the same example. Rather, the relationship is indirect, where a signal q is a function of t, and s is learned from q. Quantile or median regression distillations do not directly apply loss per example between the student's internal belief and the teacher. Instead, the quantiles or median are in the middle of the process, and are connected to the student's internal belief via additional learned parameters per each quantile—that is, the parameters (e.g., the weight and bias) learned between the student label prediction and the quantile prediction. In contrast, distillation with L1 regression or with other regressions directly uses the teacher's label $y_t$ to distill to the student belief $y_s$. L1 regression can be used to minimize towards the median, but without the smoothness properties of more quantiles, which are attained by QR distillation. Smoothness can result in a more robust and stable process, especially around the optimum. Training with multiple quantiles, on the other hand, can have more complexity requiring updating multiple losses instead of one.

Figure 8:
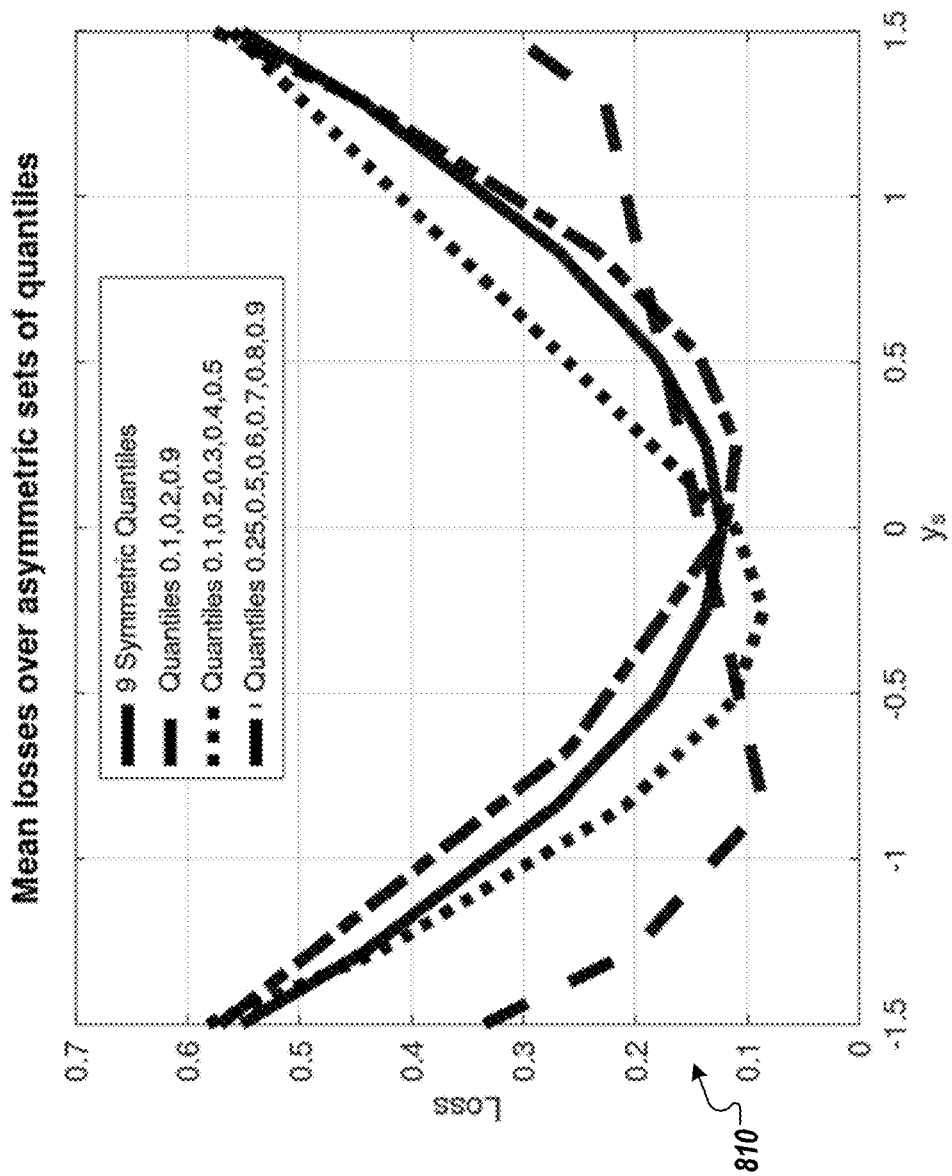
FIG. 8 shows mean losses over asymmetric sets of quantiles.

FIG. 8 shows mean losses over asymmetric sets of quantiles. As noted above, graph 745 of FIG. 7 shows that, in the symmetric case, the aggregate quantile loss has a minimum at the median (or a flat minimum going through the median if the τ=0.5 quantile is not included). Adding more quantiles smooths the loss, but does not move the optimum away from the median of the distribution. An asymmetric choice of a quantile vector results in a loss that gives a minimum skewed away from the median in the direction of the skew in the choice of quantiles depending on the set of quantiles chosen, as shown in graph 810. Note, however, that a skewed loss, or even loss with a single quantile that is not τ=0.5 can work in the configurations in FIGS. 3-7 if the student learns the true labels directly or through a different distillation loss, and has extra parameters (such as link weights and biases) that are devoted to just learning the specific quantiles. These parameters can absorb the skewness of the loss, while the internal belief of the student can be tuned properly together with an additional loss that learns the actual label.

Figure 9A:
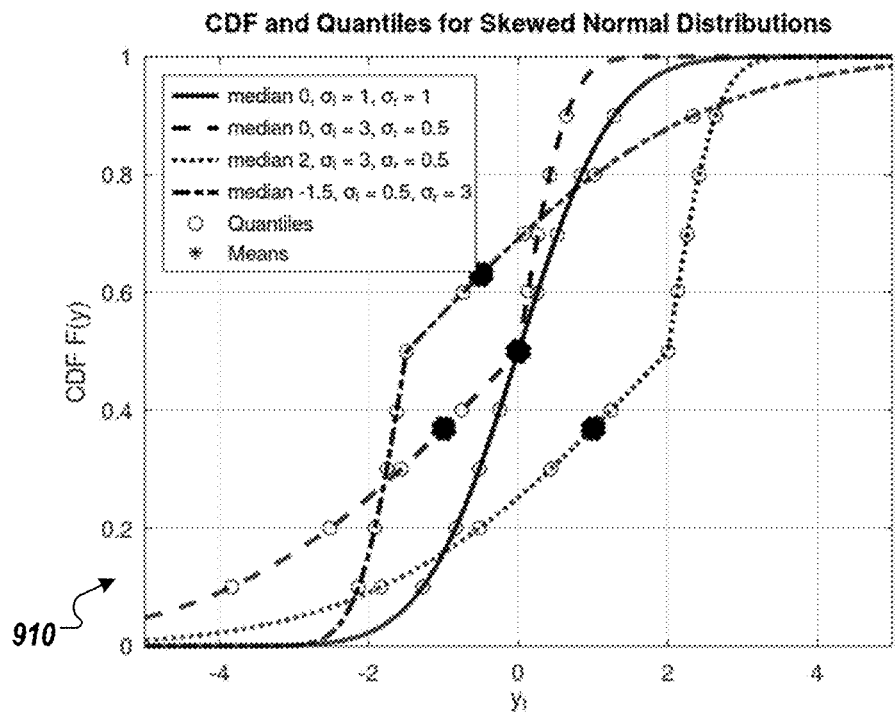
FIGS. 9A-9C show Cumulative Distribution Functions CDFs, quantiles, quantile loss and mean loss for skewed normal and Laplace distributions.
Figure 9A:
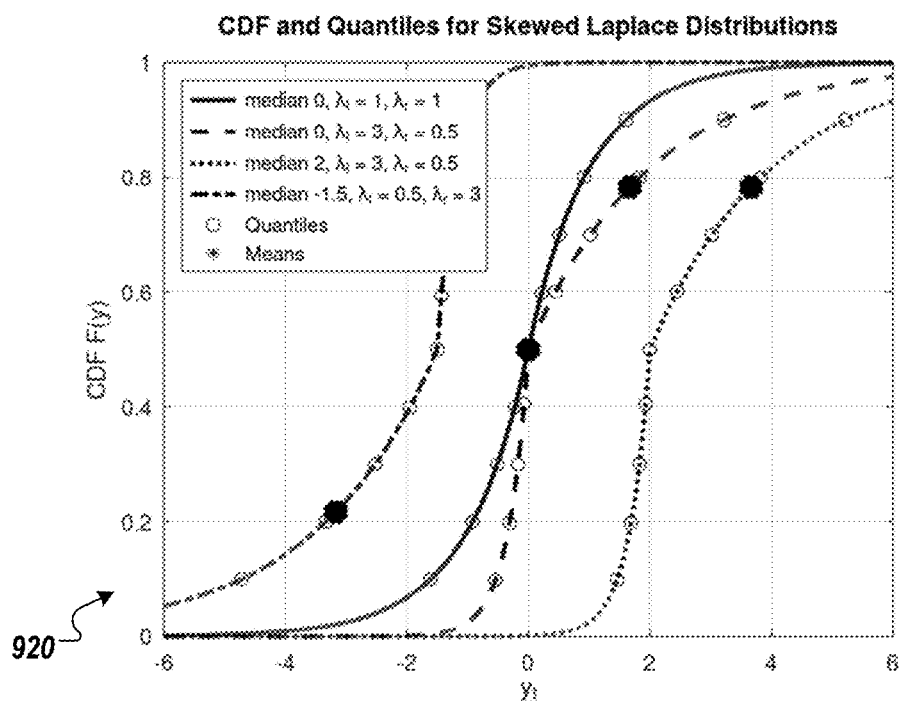
Figure 9B:
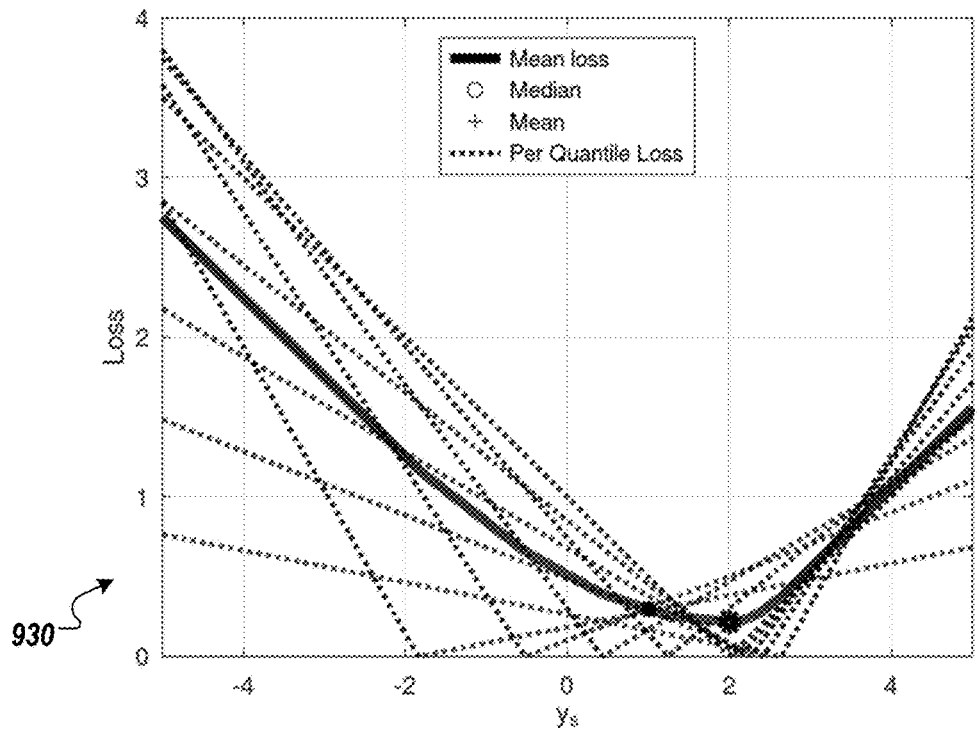
Figure 9B:
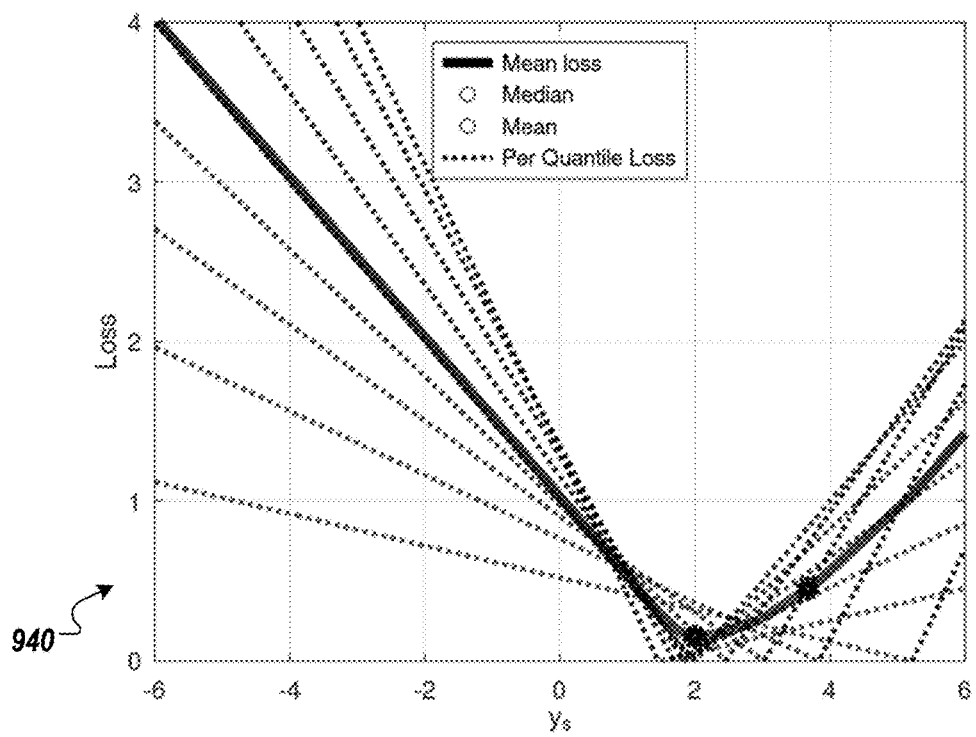
Figure 9C:
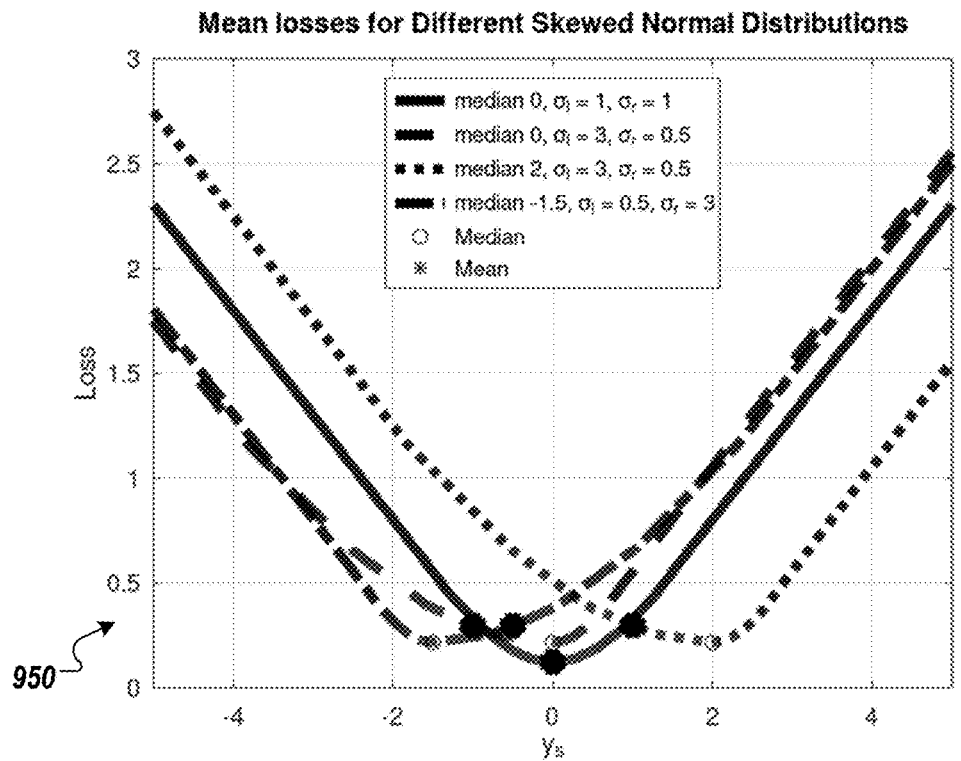
Figure 9C:
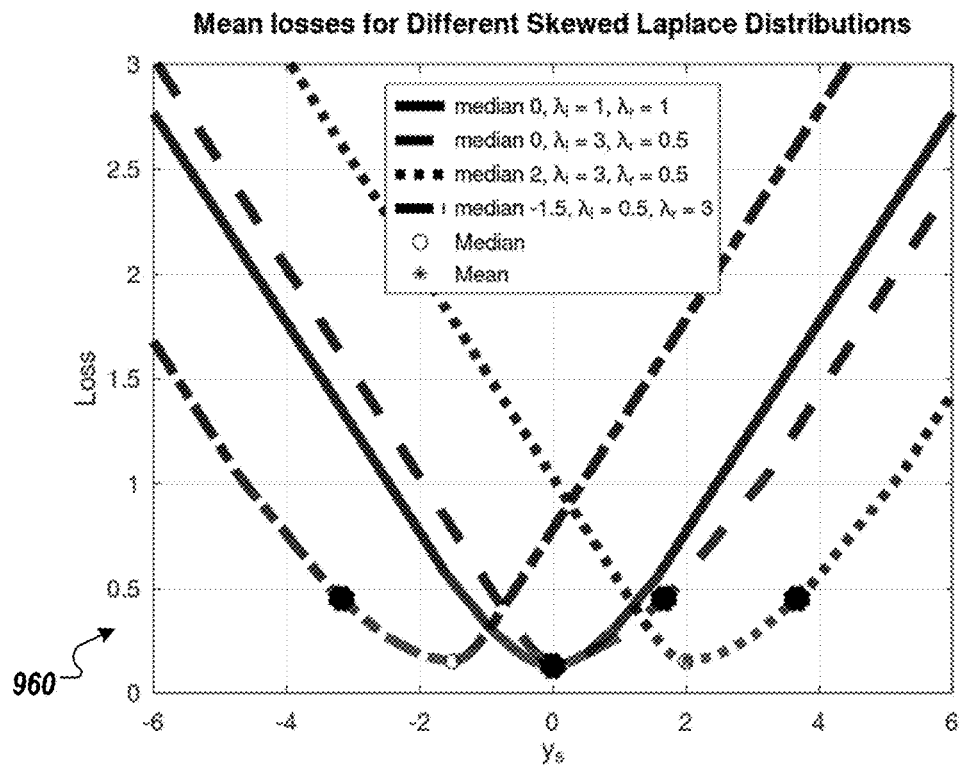

FIGS. 9A-9C show Cumulative Distribution Functions CDFs, quantiles, quantile loss and mean loss for skewed normal and Laplace distributions. The graphs 910, 920, 930, 940, 950, 960 are similar to the graphs shown in FIGS. 4 and 5, but in the graphs of FIGS. 7A-C, the teacher's distribution is skewed. Graphs 910, 930 and 950 show skewed normal distributions and graphs 920, 940 and 960 show a skewed Laplace distribution. All distributions are designed such that the variance (normal) or rate (Laplace) is different on both sides of the median. The graphs demonstrate that if the mean and median do not meet (unlike the symmetric cases above), QR or L1 regression distillations achieve the optimal loss at the median of the teacher's distribution, away from the mean. Similar graphs can be attained for bimodal and multimodal. Regardless of the number of quantiles used, the loss attains its minimum at the median of the distribution, but will be smoother with more quantiles.

Distillation in Probability vs. in Logit

Figure 10A:
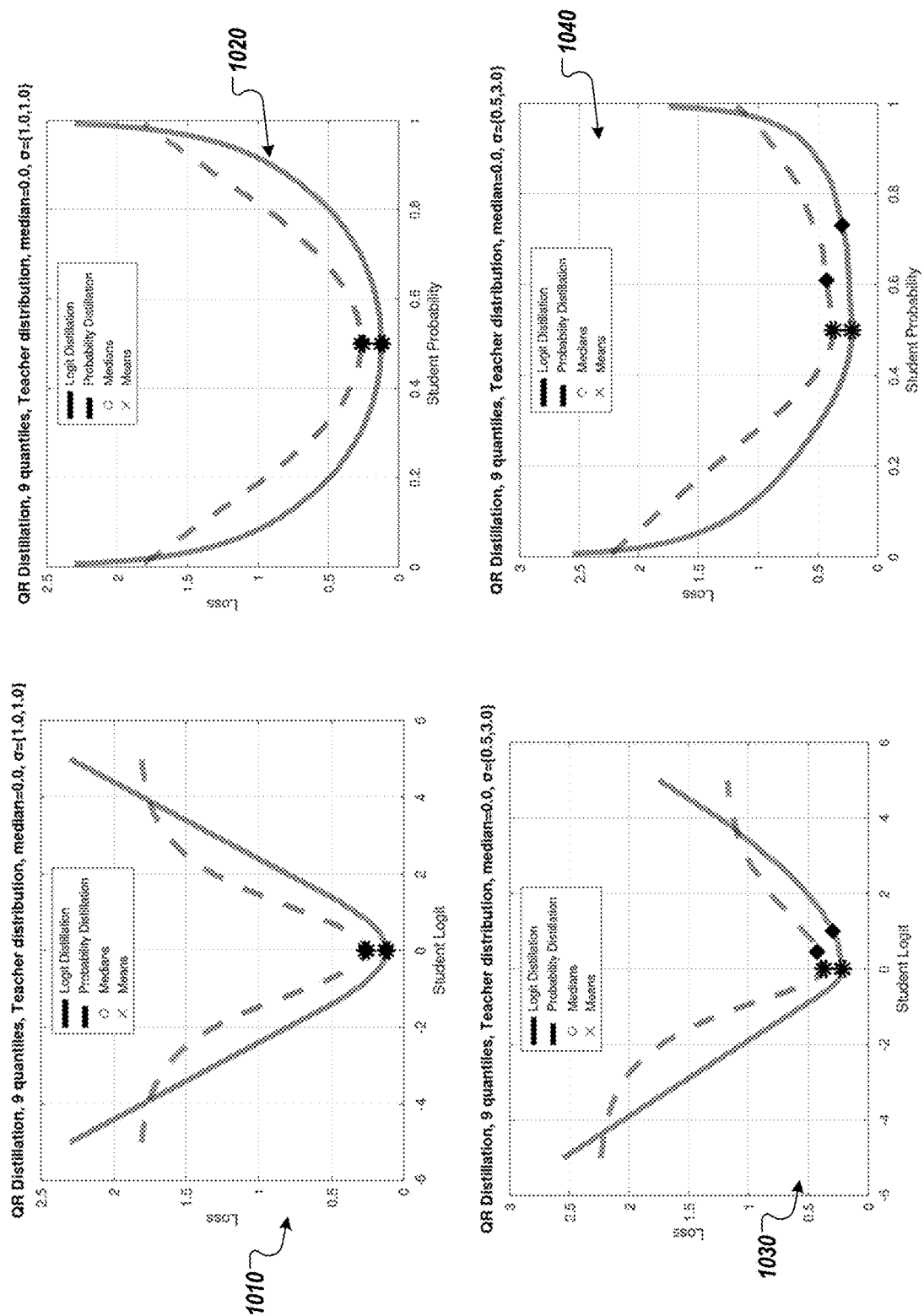
FIGS. 10A and 10B illustrate QR distillation loss with nine quantiles in logit and probability.
Figure 10B:
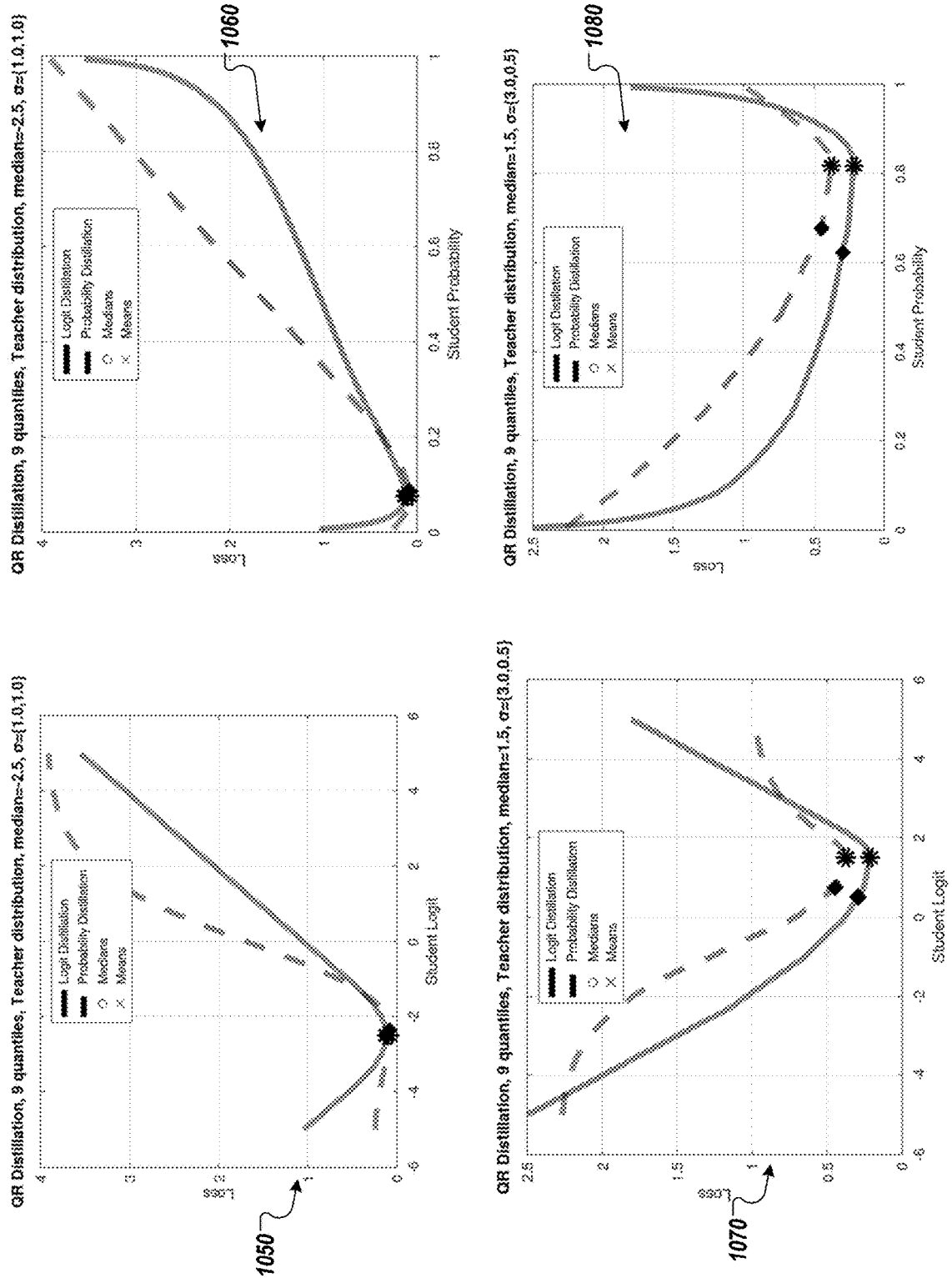
Figure 11A:
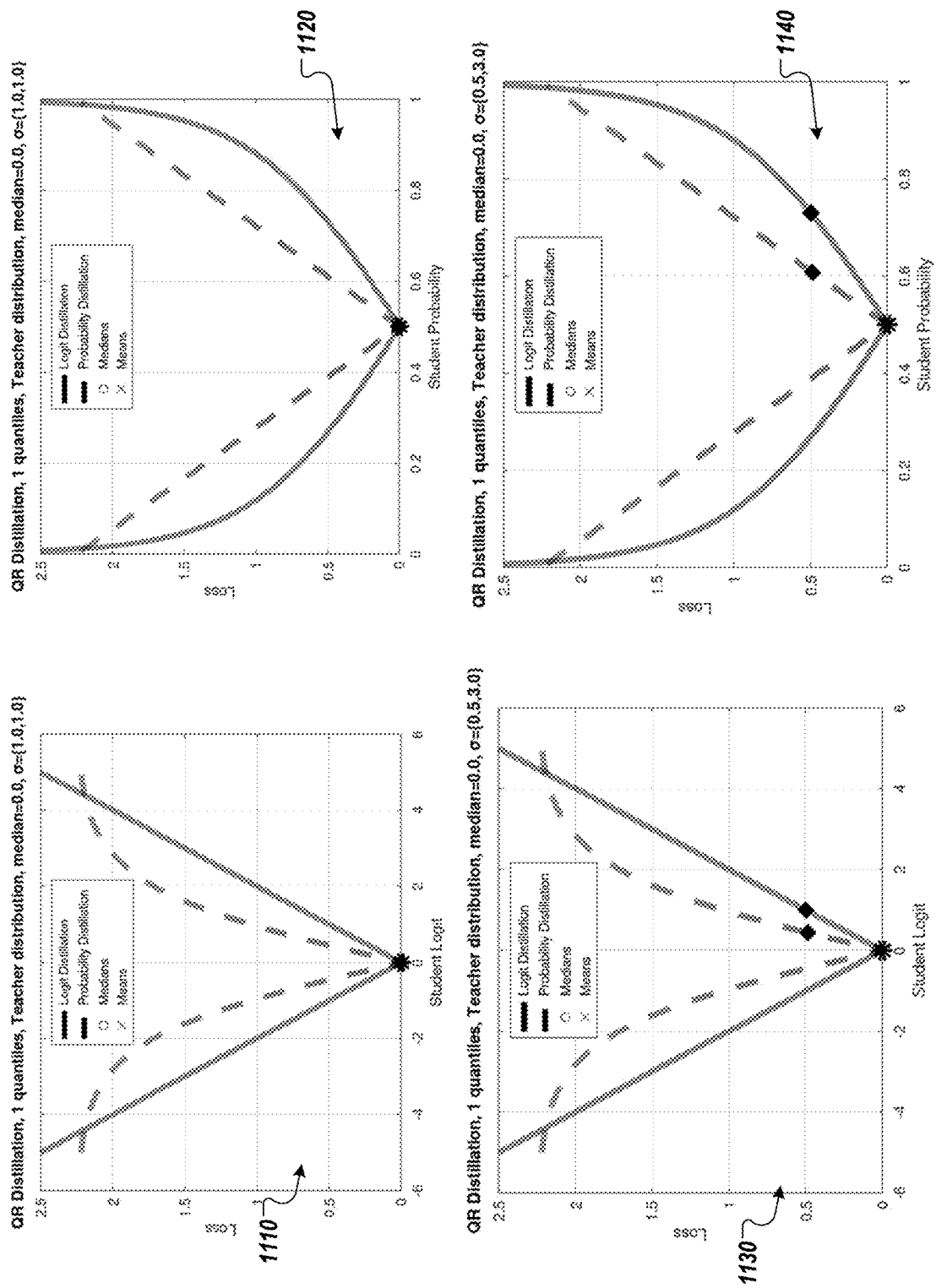
FIGS. 11A and 11B illustrate QR distillation (or L1) loss with one quantile.
Figure 11B:
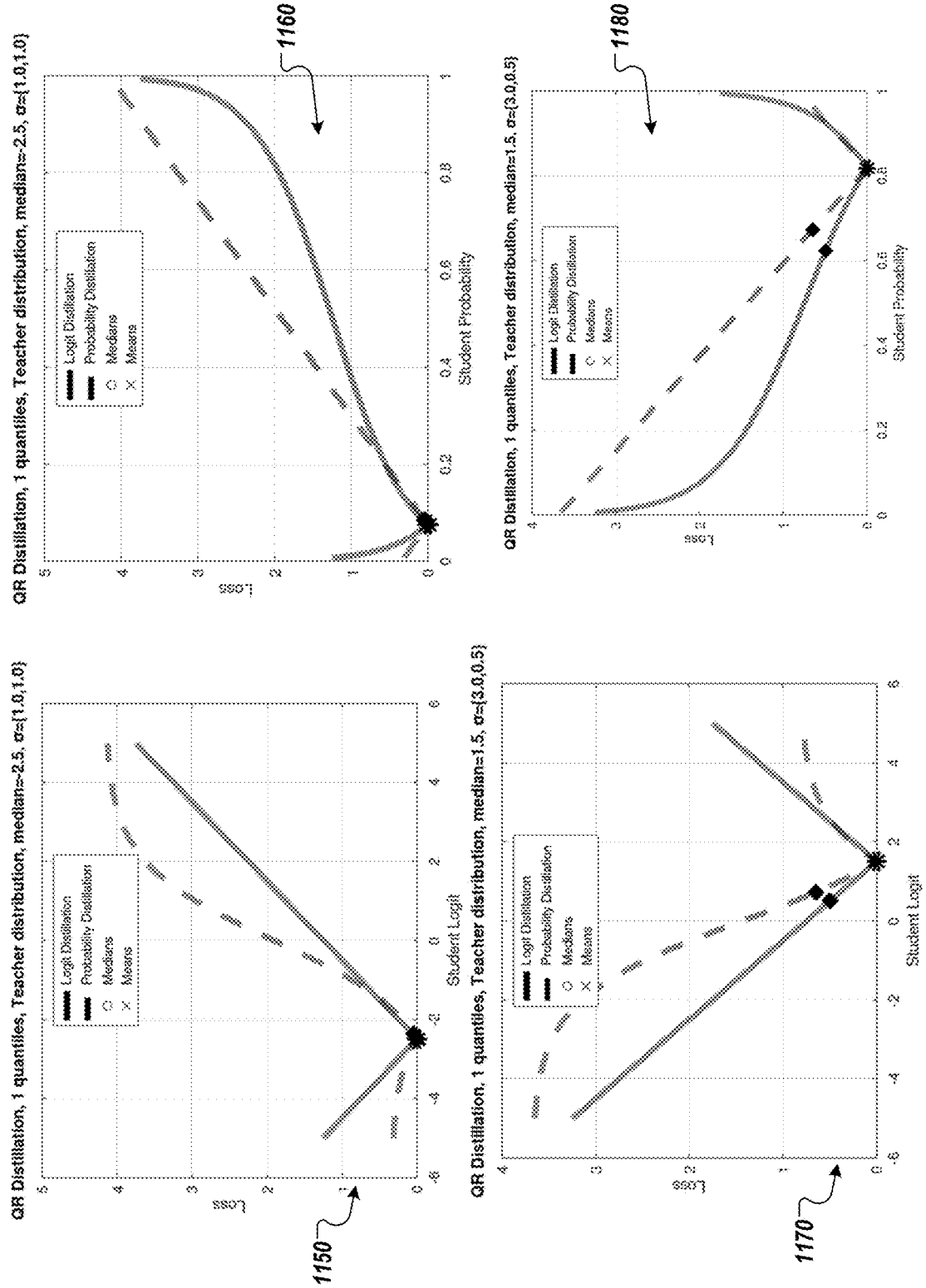

FIGS. 10A and 10B illustrate QR distillation loss with nine quantiles in logit and probability (scaled up) vs. student logit (left) 1010, 1030, 1050, 1070 and student probability (right) 1020, 1040, 1060, 1080 for different normal symmetric and skewed distributions. FIGS. 11A and 11B illustrate QR distillation (or L1) loss with one quantile in logit and probability (scaled up) vs. student logit (left) 1110, 1130, 1150, 1170 and student probability (right) 1120, 1140, 1160, 1180 for different normal symmetric and skewed distributions.

In the figures, the loss in probability is scaled up (by a factor of 9) to match the order of magnitude of the loss in logits. The curve of the loss changes depending on the domain (probability of logit) in which the distillation takes place. Because the median does not change between the domains, the minimum is achieved in the same location in both logits and probabilities.

However, the loss in the logit domain when distillation occurs in probability can exhibit inflection points. The inflection points occur because of the nonlinearity of the Sigmoid, where a large range in the logit domain maps a very small range in probability. These points, however, are away from the minimum at the median. Thus, if variations are small the median is unlikely to be in the inflection region. Outside that region, the loss is convex. However, when there are large variations of the logit signal, then recovery from large moves away from the optimum during distillation in probability may require additional training iterations, and therefore more system complexity On the other hand, as shown in 1060 in FIG. 10B and 1160 in FIG. 11B, distilling in logits can lead to inflection points in the probability domain close to the minimum, potentially slowing down the approach to the minimum (that is, requiring more training iterations). This situation can occur with highly skewed labels, even if the teacher's distribution is symmetric around the median. This suggests an advantage to distilling with QR in probability over doing distillation in logits, when one expects smaller variations in the teacher's distribution—that is, on average, fewer training iterations can be required to find an optimum. This applies to distilling for the actual label, as well as when distilling for ranking, giving advantage to distillation according to Equation 7 over Equation 5.

Specifically for ranking in recommender systems, one of the more common scenarios occurs when only the top ranked items are displayed, and only those items are included in the training data. Those examples may have positive label probabilities that are of very similar values, suggesting smaller signals around 0 in logit space for the ranking signal. Under such conditions, it can be advantageous to distill the probability signal as in Equation 7.

Note further that in the examples presented in the figures for skewed 0-median distributions, the mean in logits is farther from the median as compared to the mean in probability. This situation is caused by the nonlinearities of the Sigmoid function and Jensen's inequality. It can be advantageous to be closer to the mean in probability when the objective to minimize is cross entropy, which might not occur when optimizing rankings or other objectives.

Finally, note that in both FIGS. 10A and 11A, with a single quantile, the same loss is obtained for the same median whether the distribution is symmetric or skewed around the median. (The mean moves away for the skewed distribution). With multiple quantiles, though, as seen in FIG. 10, one side of the loss exhibits smaller gradients towards the minimum. In such cases, it can be beneficial to use fewer quantiles, or use the median for faster convergence.

Huber Loss

As background, distillation with square loss on logits pushes the student's predictions towards the mean prediction in the logit domain of the teacher for examples that are indistinguishable to the student. As described above, QR and L1 regression push the student towards the median. The mean (in probability domain) minimizes cross entropy loss. When the teacher's predictions represent a fully-specified true distribution of the labels, then distilling to the mean of the teacher's predictions in the probability domain will minimize the true loss. However, square losses are sensitive to outliers, which can push gradients beyond the optimal point, which can lead to inaccurate predictions until additional training results in recovery. Additional training results in extra computational burden.

Prediction oscillations can also occur with flat optima, with square loss objectives towards a mean. If the minimum is surrounded by regions in which the loss is mostly flat, i.e., with close to zero gradients, convergence to the optimum can be very slow—that is, it can take many iterations. One approach would increase the learning rate to speed convergence. However, that approach can cause larger movements away from the flat region that push the optimizer too far to the other side of the minimum, thereby missing the minimum. To balance between robustness and the potential for improved accuracy or loss, hybrid approaches can be used to find a midpoint. For example, Huber loss can be used in distillation, as described further below.

Huber loss can balance between the accuracy of square loss, and the robustness of absolute (L1) loss, and can provide the benefits of both approaches. Huber loss can be used for distillation and ranking distillation, where in the latter, it can be used on logit differences, probability differences, or logistic (Sigmoid) of logit differences. Huber loss can be used when distilling the teacher difference signal to the student's difference signal, by taking the Huber loss between the two points, and propagating the gradients on the loss to the student. Unlike QR distillation, Huber loss is computed pointwise and directly between the teacher and the student signal, and not through explicit or implicit determination of the teacher's quantiles, which are matched by the student.

To begin, r can be defined as the signal difference between the teacher signal t and a student signal s, that is, r=t−s. For direct label distillation, t and s can be either logit or probability scores of the teacher and student, respectively. For ranking distillation, t and s can be differences $d_t$ and $d_s$ defined using any of Equations 5, 6 or 7. The Huber loss for a pointwise example (or example pair) distillation is defined as illustrated in Equation. 9, below.

$$L_H(r) \triangleq \begin{cases} \frac{1}{2}r^2; & |r| \leq \beta \\ \beta\left(|r| - \frac{1}{2}\beta\right); & |r| > \beta \end{cases} \quad (9)$$

This equation gives a quadratic loss near the teacher's signal, minimized to the teacher's signal, but linear loss away from the teacher, which is symmetric on both sides. The quadratic region gives the smooth differentiable minimum, whereas the linear regions give robustness to outliers. The parameter beta determines the tuning between the two, and can be set to various values depending on the domain. If distillation is in probability, then values in (0,1) are used; otherwise, the Huber loss reduces to square loss. In logits, somewhat larger values can be used, but if they are too large (for example, exceeding 2), the Huber loss can again approximate L2 square loss.

Figure 12:
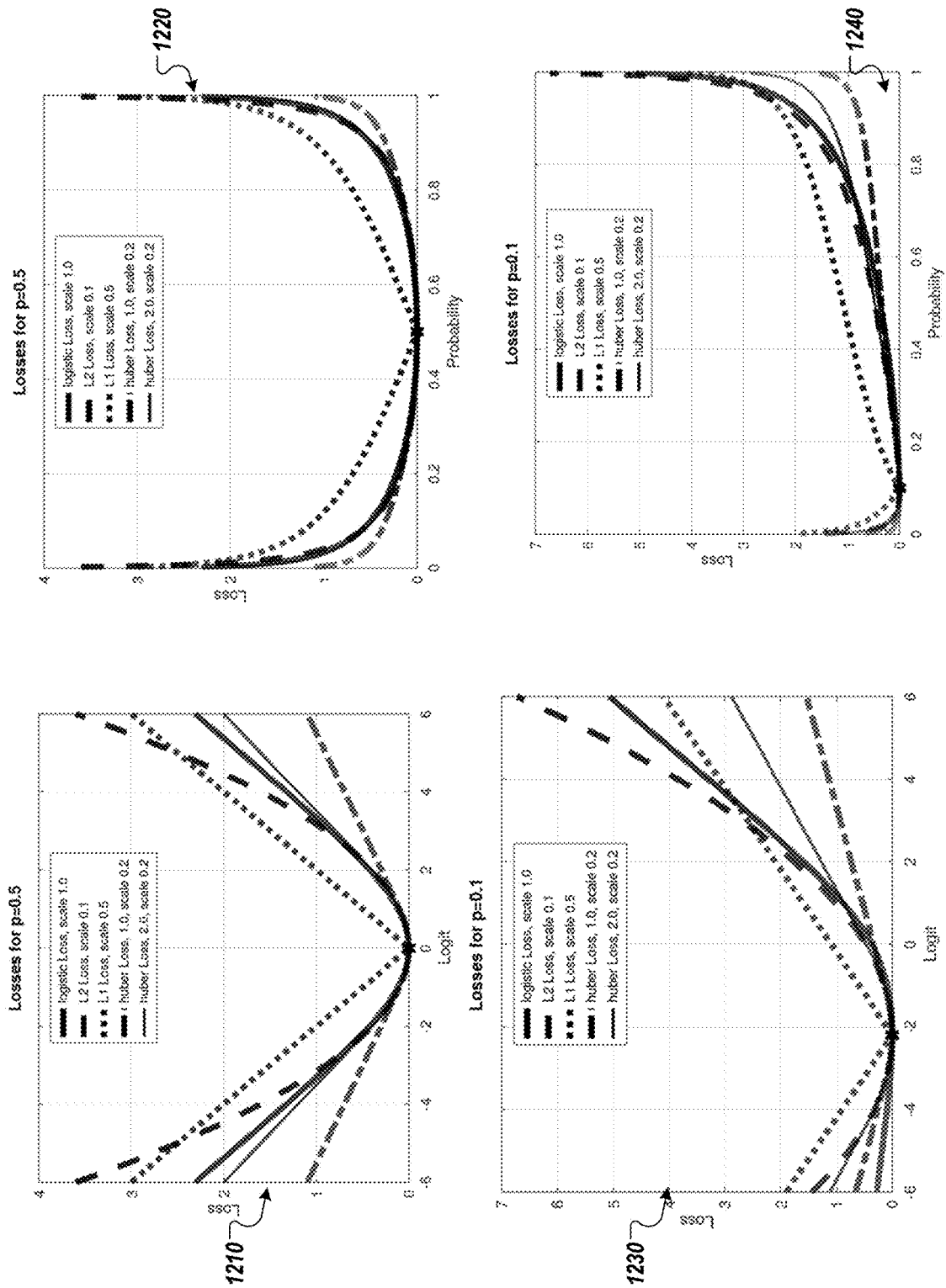
FIG. 12 demonstrates pointwise Huber loss with different values of beta.

FIG. 12 demonstrates pointwise Huber loss with different values of beta relative to L1, square, and logistic losses for two different minima points. All losses are in the logit domain. Graph 1210 illustrates losses when the probability is 0.5 as a function of logit value. Graph 1220 illustrates losses where the probability is 0.5 as a function of probability. Graph 1230 illustrates losses when the probability is 0.1 as a function of logit value. Graph 1240 illustrates losses where the probability is 0.1 as a function of probability. For comparison, losses are scaled to approximately match location, and are shifted (in graphs 1210 and 1230) such that the minimum is at loss 0.

Unlike logistic loss, and similarly to L1 and L2, Huber loss is symmetric around the minimum even for nonzero logit values. Unlike square (L2) loss, applying Huber loss results in lower magnitude slopes away from the minimum.

Figure 13A:
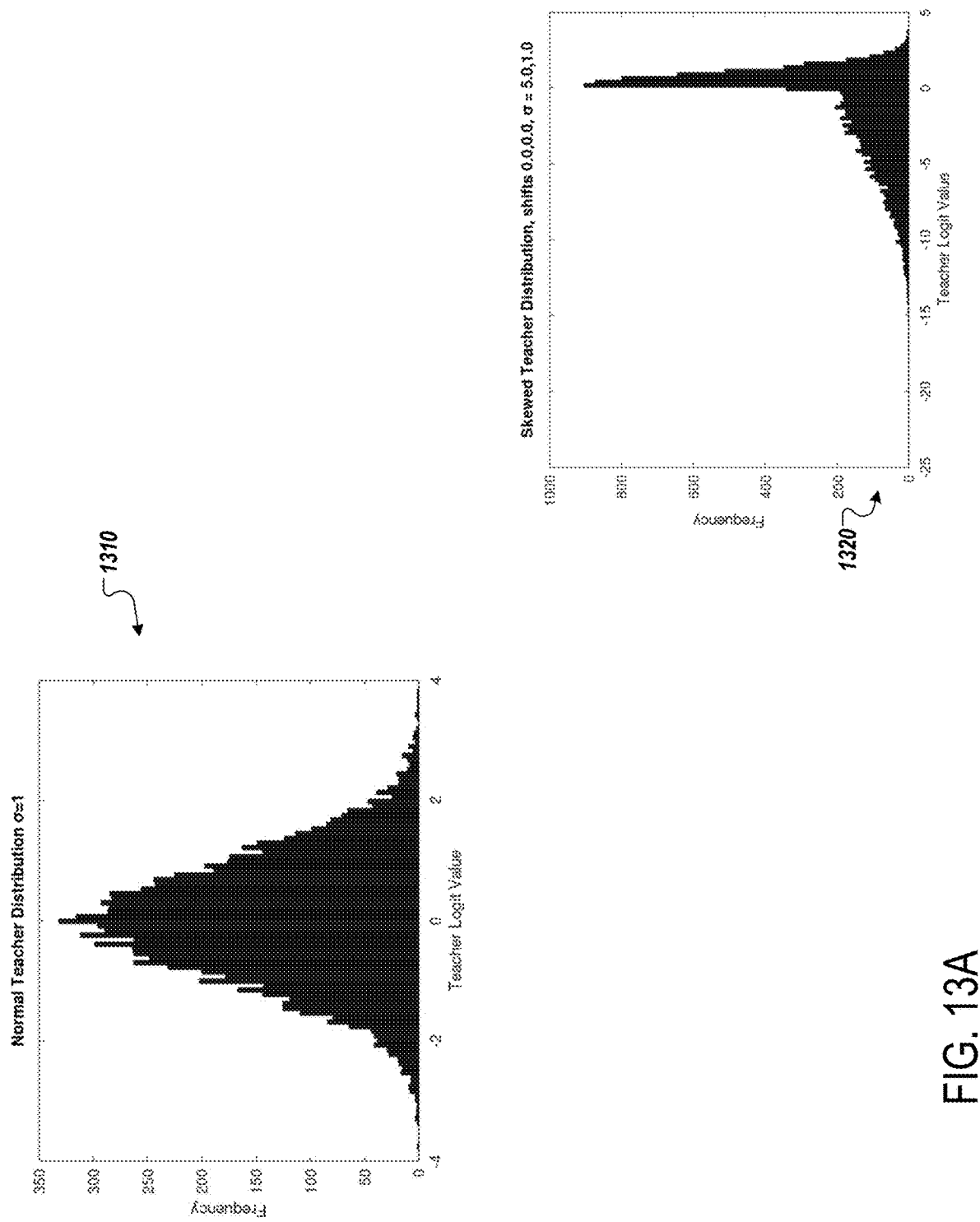
FIGS. 13A-13C illustrate the expected distillation losses relative to the student's logit and probability.
Figure 13B:
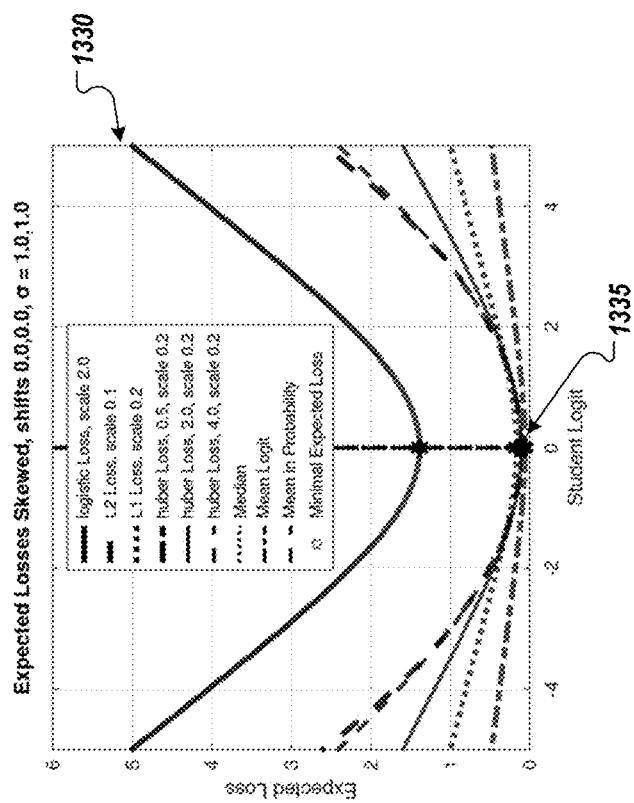
Figure 13B:
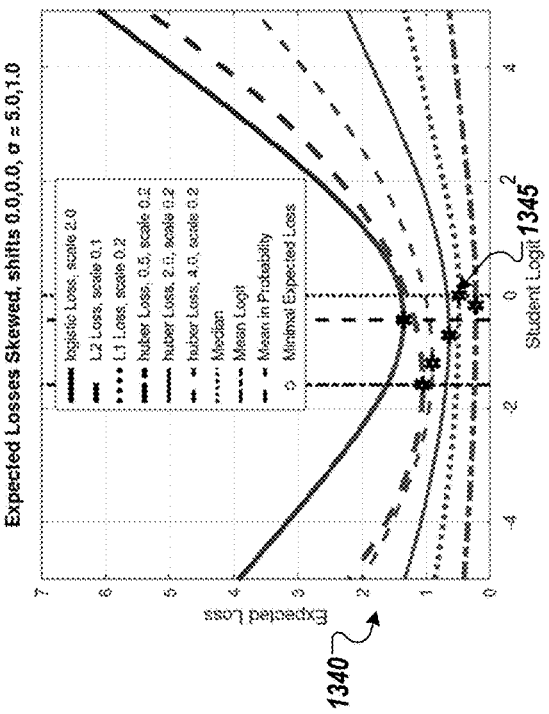
Figure 13C:
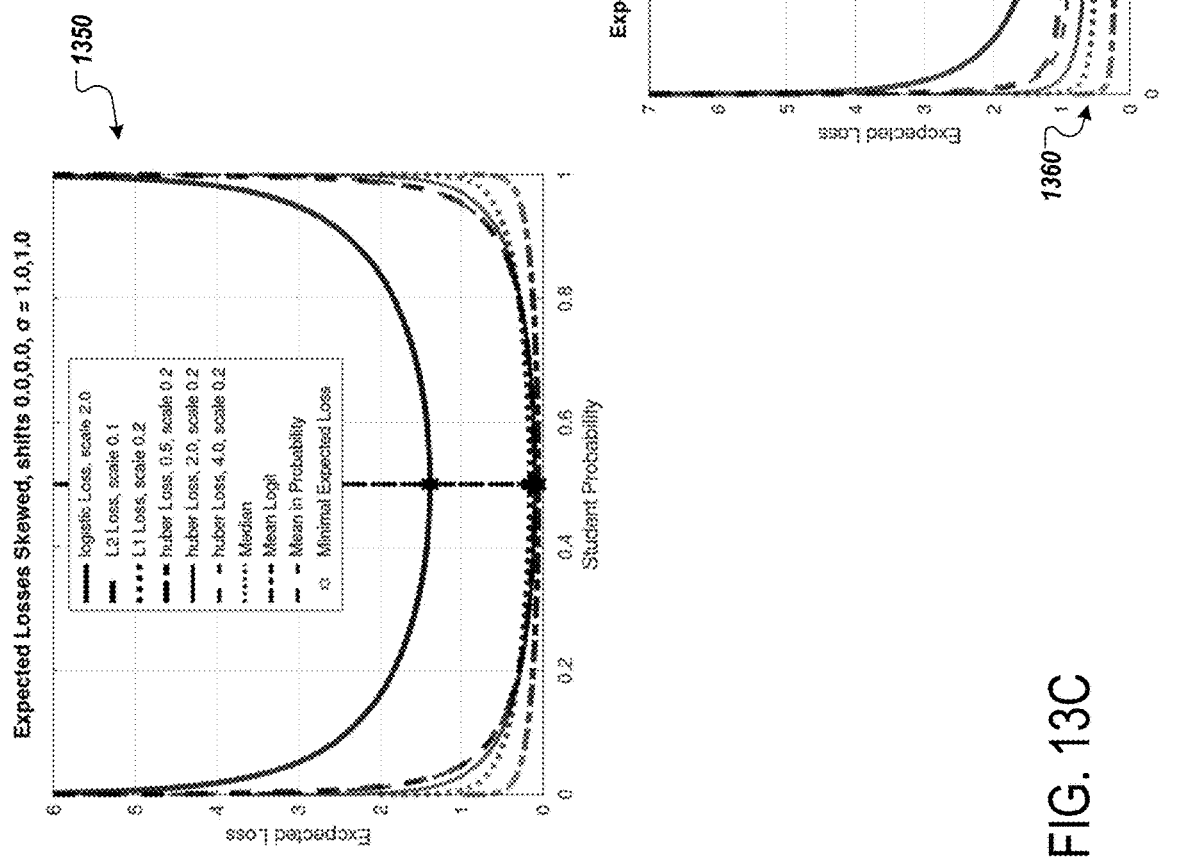

FIGS. 13A-13C illustrate the expected distillation losses relative to the student's logit and probability. Graphs 1310 and 1320 show the teacher prediction distributions for a normal distribution 1310 and for a skewed distribution 1320. Graphs 1330 and 1340 show the expected losses applied in the logit domain over this distribution as a function of the student's logit for the normal distribution 1330 and skewed distribution 1340. Graphs 1350 and 1360 show the expected losses applied in the logit domain over this distribution as a function of the student's probability for the normal distribution 1350 and skewed distribution 1360. Graphs of 1320, 1340, and 1360 show an asymmetric teacher distribution. The locations of the minima of the different loss functions are also shown (e.g., 1335 and 1345). Losses are scaled for clarity. In these illustrations, the expected curves represent the loss that a student would incur for a family of examples that appear to the student as if they are a single example (as described above), yet for which the teacher produces the given distribution of predictions. The point that achieves the minimum of this loss is the value the student will derive as its prediction for all examples in the family. Thus, the graphs of FIGS. 13A-13C describe a similar setting to that attained by using QR for a loss. Losses shown are logistic, square, L1, and Huber for different values of the Huber parameter.

For symmetric distributions, all losses attain the minimum at the same location (either mean or median). However, for skewed distributions, the figure illustrates the differences for the points that achieve the minima. Square (L2) loss on logits achieves the minimum at the logit mean of the distribution, logistic loss at the probability mean, and L1 at the median of the teacher's distribution. The Huber loss achieves the minimum between the two extremes (median and logit mean). With small beta, Huber is similar to L1, and the minimum is closer to the median. With larger beta, the minimum approaches the logit mean. Most importantly, however, if Huber loss is applied on logits for the skewed distribution as in FIG. 13, there is some value of beta for which the minimum is attained for the desired probability mean (which optimizes cross entropy loss).

In distillation, Huber loss can be used for both distilling single examples and for distilling ranking. When distilling for single examples, skewed distributions can accurately represent the teacher's predictions. This property can leverage a tuned Huber loss to combine faster L2 (square loss) convergence, resulting in fewer computing resources necessary for training, with minimum at the distribution probability mean, leading to improved accuracy. When distilling pairs for ranking, it is possible that distributions will be more symmetric or scattered close to 0, as many applications train on example pairs for which the model produces relatively close predictions. However, even then, a tuned Huber loss can still be beneficial as it results in better tuning of the loss.

Alternatives to Huber Loss

The Huber loss function is related to the Smooth ReLU (SmeLU) function, and is a member of the more general family of Generalized SmelU (G-SmeLU) functions. G-SmeLU is a piecewise smooth function, with parameterized left and right gradients, between which there is a quadratic element. The function is designed such that the gradients in the connections between different pieces are continuous.

Specifically, G-SmeLU is defined by the 5 parameters $\{\alpha, \beta, g_-, g_+, t\}$. The parameters $\alpha$ and $\beta$ are the transition locations, where at $\alpha$, the function transitions from linear to quadratic, and at $\beta$ back from quadratic to linear. The slopes on the left and right are $g_-$ and $g_+$, respectively, and t is the vertical displacement of the function at alpha. For a loss function with gradient based optimization, the vertical displacement of the whole graph is not important, so t can be set to 0. The equations of a G-SmeLU loss are given by Equations 10 and 11, below.

$$y = \begin{cases} g_x - g_\alpha; & x \le \alpha \\ ax^2 + bx + c; & \alpha \le x \le \beta \\ g_+ x + \dfrac{-\alpha+\beta}{2}g_- - \dfrac{\alpha+\beta}{2}g_+; & x > \beta \end{cases} \quad (11)$$

Where $$a = \frac{g_+ - g_-}{2(\beta - \alpha)}$$

$$b = \frac{-\alpha g_+ + \beta g_-}{\beta - \alpha}$$

$$c = \frac{\alpha^2(g_+ + g_-) - 2\alpha\beta g_-}{2(\beta - \alpha)}$$

x is the level of the student signal (logit or probability), where y gives the loss. The minimum is attained as shown in Equation 12, below.

$$x_m = \frac{\alpha g_+ - \beta g_-}{g_+ - g_-} \quad (12)$$

The loss function can be designed such that the minimum is attained for the teacher's prediction by tuning the parameters so that $x_m$ meets the teacher's prediction at a given point.

However, in addition to the properties of Huber loss, the more general G-SmeLU function provides more flexibility in tuning the loss to specific needs For example, different slopes can be tuned. Further, it can be calibrated to specific values of the teacher's signal. Specifically, if skewed losses are needed, G-SmeLU gives a method similar to Huber loss to design such losses. Instead of tuning a single beta parameter, all parameters can be tuned for best performance on a specific dataset. The additional degrees of freedom provide more flexibility for better performance. Designing a general G-SmeLU loss can be called "Smelularization," as it is a regularization form towards the teacher's prediction.

Figure 14:
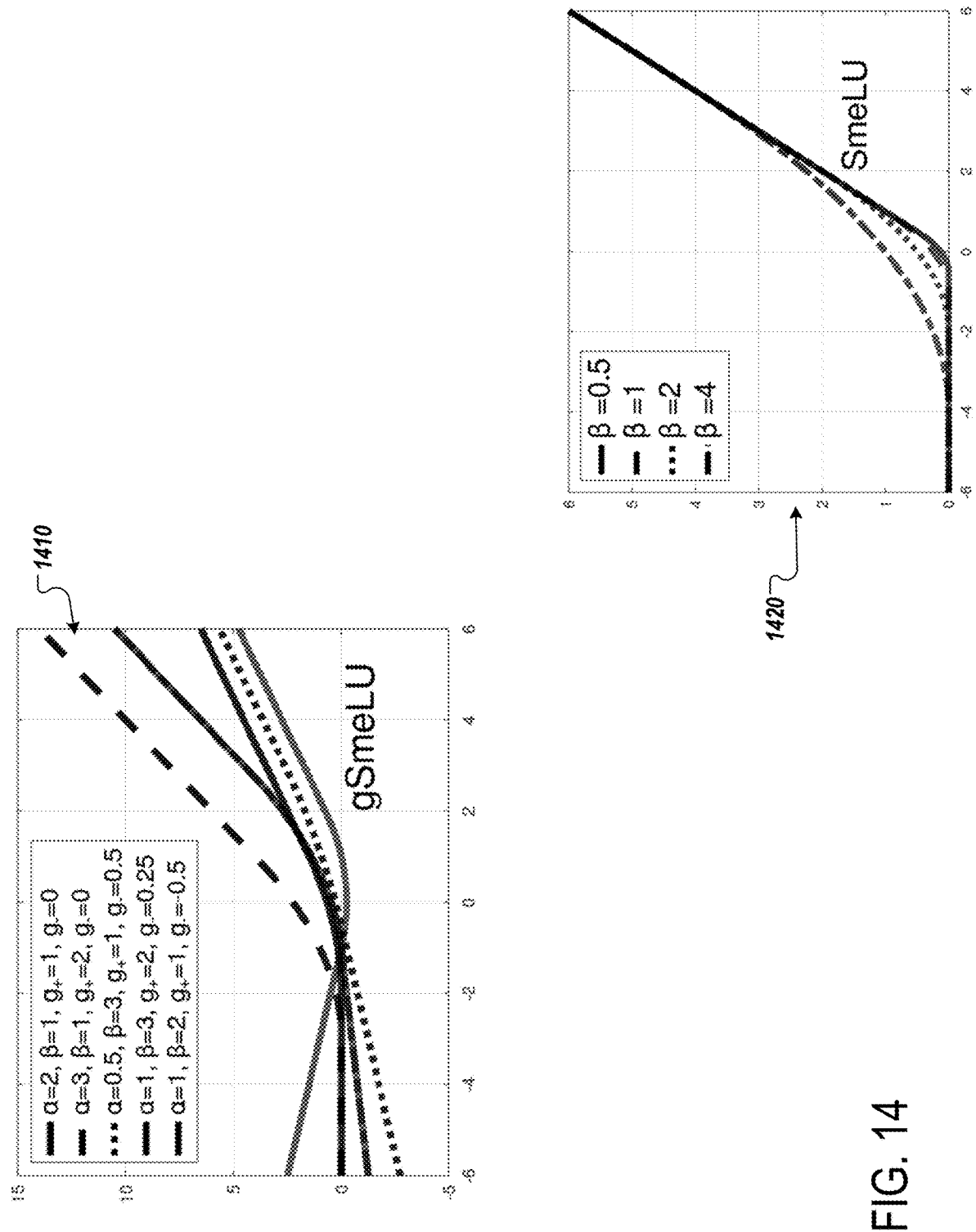
FIG. 14 illustrates examples of G-SmeLU curves.

FIG. 14 illustrates examples of G-SmeLU curves. Graph 1410 shows G-SmeLU plots for various parameters. For G-SmeLU the absolute value of negative alphas is noted in the legend (upper left). G-SmeLU can be viewed as a general case of piecewise smooth functions with multiple pieces. An even wider generalization can add more pieces (for example, quadratic at both ends) to the loss.

In addition, an asymmetric version of a Huber-like loss, which sets the loss to 0 on one side, is the SmeLU function, which is a special case of the G-SmeLU function, with $\alpha=-\beta$, $g_-=0$, and $g_+=1$, given by Equation 13, below.

$$y = \begin{cases} 0; & x \le -\beta \\ \dfrac{(x+\beta)^2}{4\beta}; & |x| \le \beta \\ x; & x \ge \beta \end{cases} \quad (13)$$

Graph 1420 illustrates SmeLU functions for three values of β, 1, 2 and 3.

Smoothing the Quantiles

The quantile regression loss for quantile τ can be determined as shown in Equation 14, below.

$$L_t(\tau, y_t, q) = (1-\tau)\text{ReLU}(q-y_t) + \tau\text{ReLU}(y_t-q) \quad (14)$$

ReLuU(x)=max(x, 0) defines the Rectified Linear Unit.

Equation 14 provides a loss that is not smooth at the minimum; instead, there is an abrupt change in the gradient at the minimum. Unification of multiple quantiles provides a piecewise linear loss, as described previously in reference to FIG. 6, with subtle abrupt transitions of the gradient at the quantile minima. L1 regression loss and QR with a single quantile at the median still result in a large abrupt change in gradient at the minimum.

In some implementations, the system can smooth QR losses. For example, the ReLU function, as shown in Equation 14, can be replaced by a smooth function, such as $x^2$, $[\text{ReLU}(x)]^2$, SmeLU(x, β), swish, softplus and other smooth activations. The effects of this using alternate functions depends on the specific conditions. If the teacher's prediction quantiles are learned first, and those values are fixed (with the regular QR loss, or with L1 regression for the median), then the smoothing will have, for multiple quantiles QR, similar effects to those of Huber loss, which will attain the minimum between the median and the logit teacher mean, where it approaches the logit mean when more smoothing is applied. However, because there will not be a 0 (or 1) quantile for logits (which may be infinite), the minimum value will not equal the logit mean.

In implementations with the single median quantile, the minimum will be achieved at the median, as long as the teacher's quantile is fixed and is used to learn the student quantile. This technique can smooth a loss that attains the minimum at the median.

However, distilling with the methods described in reference to FIGS. 1-3 does not force the teacher quantiles to follow the teacher's distribution, unless the quantile loss shown in Equation 1 is used to first fix q. Using, for example, $x^2$ for the loss will be no different from using square L2 distillation, which attains the minimum at the mean logit (if distillation is performed on logits). Thus, to attain a smooth loss with minimum at the median, a two-step distillation can be performed: (i) L1 loss is used on the teacher's predictions to obtain the median, and (ii) a smooth loss is applied towards that median on the student's predictions (and q learned by the L1 loss is not allowed to be changed by the student's signals). Example smooth loss functions include Huber loss, SmeLU, G-SmeLU, LogCosh, Swish, Sigmoid and Softplus. Other smooth loss functions can be used.

Figure 15:
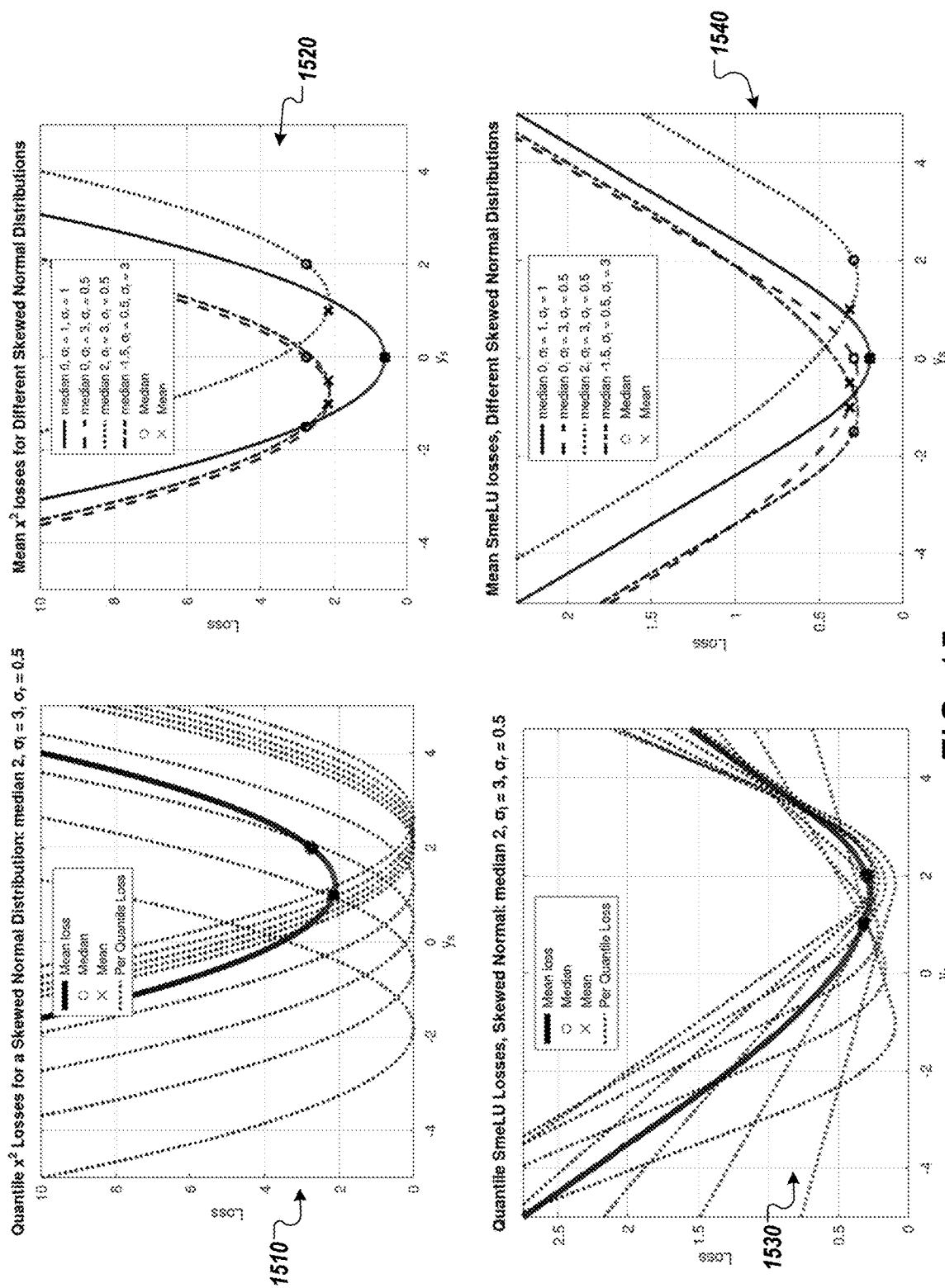
FIG. 15 illustrates loss curves with smoothed QR losses with fixed quantiles as functions of the student signal.

FIG. 15 illustrates loss curves 1510, 1520, 1530, 1540 with smoothed QR losses with fixed quantiles as functions of the student signal. Multiple quantile losses are shown for one skewed distribution previously illustrated in FIG. 9, as well as the average QR losses for the skewed normal distributions in FIG. 9. Losses are shown for a single quantile and for nine quantiles for smoothing with $x^2$ and with SmeLU where β=1. Similar graphs can be attained with other smoothing functions, such as swish and softplus. Whether $x^2$ or SmeLU is used, with the median only, a smooth curve with minimum at the median is attained. With additional quantiles, a smooth loss is obtained, but the minimum is pushed between the median and the mean of the teacher's distribution. The smoother the function, the closer the minimum is to the teacher's distribution mean. However, as long as the teacher's distribution has infinite support, the optimum will not reach that mean.

With multiple quantiles, and functions such as SmeLU, Huber, $\text{RelU}^2$, even when the quantiles of the teacher are not pre-trained by the student, similar effects can be observed, where the minimum is moved away from the median towards the mean.

Figure 16:
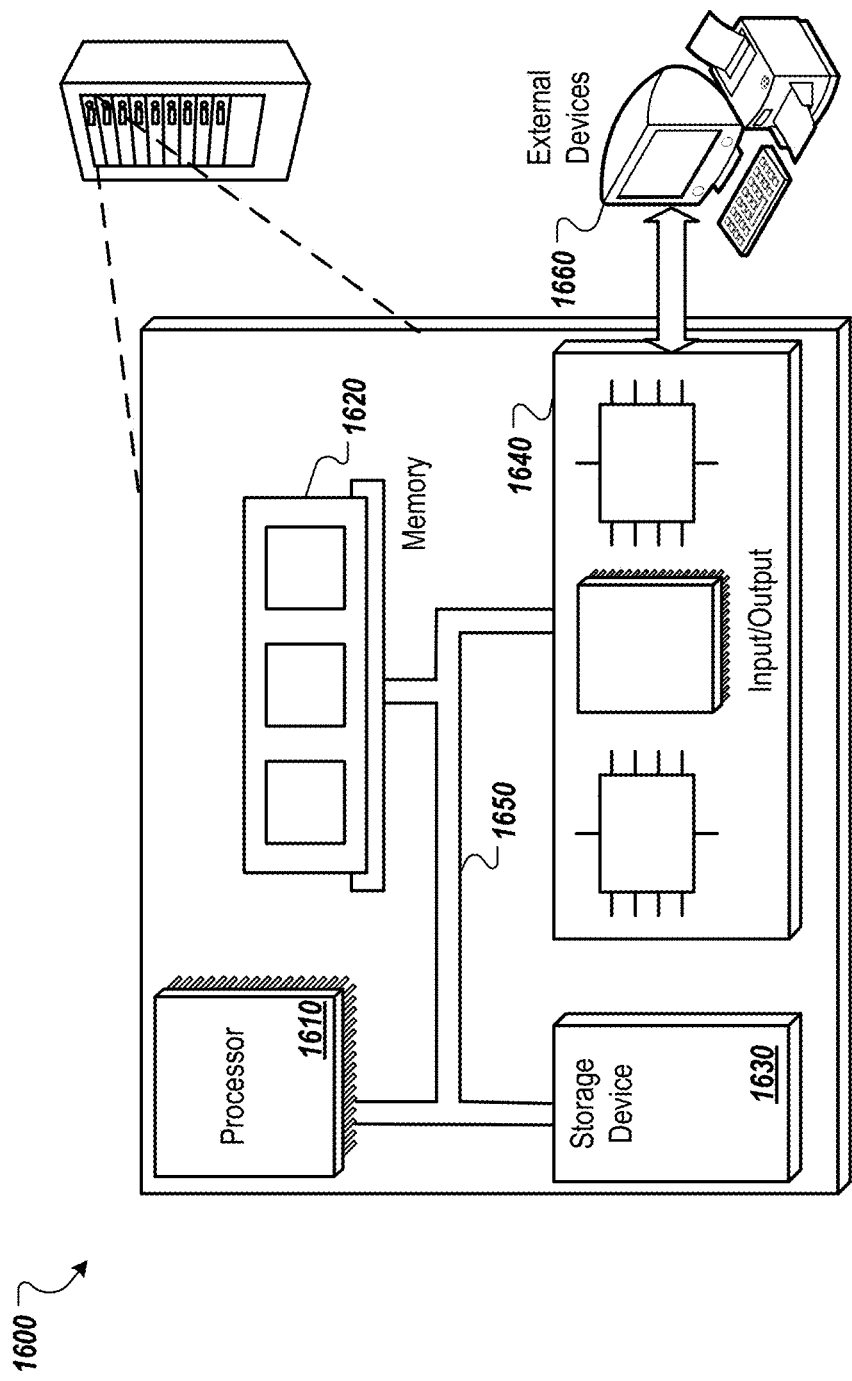
FIG. 16 is a block diagram of an example computer system.

FIG. 16 is a block diagram of an example computer system 1600 that can be used to perform operations described above. The system 1600 includes a processor 1610, a memory 1620, a storage device 1630, and an input/output device 1640. Each of the components 1610, 1620, 1630, and 1640 can be interconnected, for example, using a system bus 1650. The processor 1610 is capable of processing instructions for execution within the system 1600. In some implementations, the processor 1610 is a single-threaded processor. In another implementation, the processor 1610 is a multi-threaded processor. The processor 1610 is capable of processing instructions stored in the memory 1620 or on the storage device 1630.

The memory 1620 stores information within the system 1600. In one implementation, the memory 1620 is a computer-readable medium. In some implementations, the memory 1620 is a volatile memory unit. In another implementation, the memory 1620 is a non-volatile memory unit.

The storage device 1630 is capable of providing mass storage for the system 1600. In some implementations, the storage device 1630 is a computer-readable medium. In various different implementations, the storage device 1630 can include, for example, a hard disk device, an optical disk device, a storage device that is shared over a network by multiple computing devices (e.g., a cloud storage device), or some other large capacity storage device.

The input/output device 1640 provides input/output operations for the system 1600. In some implementations, the input/output device 1640 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 1660, e.g., keyboard, printer and display devices. Other implementations, however, can also be used, such as mobile computing devices, mobile communication devices, set-top box television client devices, etc.

Although an example processing system has been described in FIG. 16, implementations of the subject matter and the functional operations described in this specification can be implemented in other types of digital electronic circuitry, or in computer software, firmware, or hardware, including the structures disclosed in this specification and their structural equivalents, or in combinations of one or more of them.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   obtaining, from a server system, a first machine learning model that is configured to output a score and that has been trained on a plurality of training examples that each include:
   feature values that represent features of an item, and;
   an outcome label for the item;
   determining, from the training examples, training pairs of training examples, wherein each training pair includes a first training example and a second training example;
   for each training pair:
   generating a score for each training example in the training pair using the first machine learning model;

determining, for the training pair, a score difference of the scores generated for the training examples in the training pair; and training, using the training pairs and the score differences, a second machine learning model to produce score differences that, for the same training examples, are within a threshold value of the score differences produced by the first machine learning model, wherein the training is based, in part, on a plurality of quantile loss functions that each receive, as input, respective score difference for a respective quantile from a corresponding plurality of quantiles, wherein the second machine learning model is smaller than the first machine learning model such that the second machine learning model is executable on a computer device with fewer computer resources than required by the first machine learning model; and providing the second machine learning model to the computer device.

2. The computer-implemented method of claim 1, wherein the score is a logit score.

3. The computer-implemented method of claim 1, wherein the score is a predicted probability.

4. The computer-implemented method of claim 1, wherein the score difference is a sigmoid of logit score differences.

5. The computer-implemented method of claim 1, wherein the quantile losses for the plurality of quantiles are produced by a smooth function.

6. The computer-implemented method of claim 5 wherein the smooth function is one of a Huber loss, SmeLU, G-SmeLU, LogCosh, Swish, Sigmoid or Softplus.

7. The computer-implemented method of claim 1 wherein a quantile loss function in the one or more quantile loss functions is an L1 loss, a median loss or an absolute value loss.

8. The computer-implemented method of claim 1, wherein a loss is determined, at least in part, by determining a difference between a teacher score and a student score.

9. The computer-implemented method of claim 1 wherein determining the training pairs of training examples further comprises: for each training pair in the pairs of training examples, determining that the outcome label of the first training example differs from the outcome label of the second training example.

10. A system comprising one or more computers and one or more storage devices storing instructions that when executed by the one or more computers cause the one or more computers to perform operations comprising:
obtaining, from a server system, a first machine learning model that is configured to output a score and that has been trained on a plurality of training examples that each include:
feature values that represent features of an item, and;
an outcome label for the item;
determining, from the training examples, training pairs of training examples, wherein each training pair includes a first training example and a second training example;
for each training pair:
generating a score for each training example in the training pair using the first machine learning model;
determining, for the training pair, a score difference of the scores generated for the training examples in the training pair; and
training, using the training pairs and the score differences, a second machine learning model to produce score differences that, for the same training examples, are within a threshold value of the score differences produced by the first machine learning model, wherein the training is based, in part, on a plurality of quantile loss functions that each receive, as input, respective score difference for a respective quantile from a corresponding plurality of quantiles, wherein the second machine learning model is smaller than the first machine learning model such that the second machine learning model is executable on a computer device with fewer computer resources than required by the first machine learning model; and
providing the second machine learning model to the computer device.

11. The system of claim 10, wherein the score is a logit score.

12. The system of claim 10, wherein the score is a predicted probability.

13. The system of claim 10, wherein the score difference is a sigmoid of logit score differences.

14. The system of claim 10, wherein the quantile losses for the plurality of quantiles are produced by a smooth function.

15. The system of claim 14 wherein the smooth function is one of a Huber loss, SmeLU, G-SmeLU, LogCosh, Swish, Sigmoid or Softplus.

16. The system of claim 10 wherein a quantile loss function in the one or more quantile loss functions is an L1 loss, a median loss or an absolute value loss.

17. The system of claim 10, wherein a loss is determined, at least in part, by determining a difference between a teacher score and a student score.

18. The computer-implemented method of claim 1 wherein determining the training pairs of training examples further comprises: for each training pair in the pairs of training examples, determining that the outcome label of the first training example differs from the outcome label of the second training example.

19. One or more non-transitory computer-readable storage media storing instructions that when executed by one or more computers cause the one or more computers to perform operations comprising:
obtaining, from a server system, a first machine learning model that is configured to output a score and that has been trained on a plurality of training examples that each include:
feature values that represent features of an item, and;
an outcome label for the item;
determining, from the training examples, training pairs of training examples, wherein each training pair includes a first training example and a second training example;
for each training pair:
generating a score for each training example in the training pair using the first machine learning model;
determining, for the training pair, a score difference of the scores generated for the training examples in the training pair; and
training, using the training pairs and the score differences, a second machine learning model to produce score differences that, for the same training examples, are within a threshold value of the score differences produced by the first machine learning model, wherein the training is based, in part, on a plurality of quantile loss functions that each receive, as input, respective score difference for a respective quantile from a corresponding plurality of quantiles, wherein the second machine learning model is smaller than the first machine learning model such that the second machine learning model is executable on a computer device with fewer computer resources than required by the first machine learning model; and providing the second machine learning model to the computer device.

20. The one or more non-transitory computer-readable storage media of claim 19, wherein the score difference is a sigmoid of logit score differences.

* * * * *